United States Patent
Jang et al.

(10) Patent No.: US 9,345,008 B2
(45) Date of Patent: May 17, 2016

(54) METHOD AND DEVICE FOR TRANSMITTING UPLINK CONTROL INFORMATION HAVING LARGE PAYLOAD IN WIRELESS ACCESS SYSTEM

(75) Inventors: Jiwoong Jang, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/115,294

(22) PCT Filed: May 2, 2012

(86) PCT No.: PCT/KR2012/003428
§ 371 (c)(1),
(2), (4) Date: Nov. 1, 2013

(87) PCT Pub. No.: WO2012/150808
PCT Pub. Date: Nov. 8, 2012

(65) Prior Publication Data
US 2014/0056273 A1    Feb. 27, 2014

Related U.S. Application Data

(60) Provisional application No. 61/481,700, filed on May 2, 2011.

(51) Int. Cl.
*H04W 4/00* (2009.01)
*H04W 72/04* (2009.01)
(Continued)

(52) U.S. Cl.
CPC ......... *H04W 72/0413* (2013.01); *H04L 1/0026* (2013.01); *H04L 1/0028* (2013.01);
(Continued)

(58) Field of Classification Search
None
See application file for complete search history.

(56) References Cited

U.S. PATENT DOCUMENTS

2009/0201825 A1    8/2009    Shen et al.
2010/0309863 A1    12/2010    Sangiamwong et al.
(Continued)

FOREIGN PATENT DOCUMENTS

KR    10-2009-0085004 A    8/2009
WO    WO 2010/064407 A1    6/2010
(Continued)

OTHER PUBLICATIONS

3GPP TSG RAN WG1 #61, R1-102728, "Consideration on UCI and PUSCH Data Multiplexing Scheme in Multi-layer PUSCH Transmission", LG Electronics, Discussion and decision, Montreal, Canada, May 10-14, 2010, pp. 1-4.
(Continued)

*Primary Examiner* — Yemane Mesfin
*Assistant Examiner* — Jeff Banthrongsack
(74) *Attorney, Agent, or Firm* — Birch, Stewart, Kolasch & Birch, LLP

(57) ABSTRACT

The present invention relates to a method and devices for transmitting uplink control information (UCI) having a large payload size in a carrier aggregation environment. The method for transmitting the UCI having a large sized payload in a wireless access system, as an embodiment of the present invention, comprises the steps of: finding the number of first resource elements allocated to channel quality information (CQI) information to be included in the UCI; finding the number of second resource elements allocated to a rank indicator (RI) information to be included in the UCI; finding the coding rate of data transmitted with the UCI, considering the number of the first resource elements and the number of the second resource elements; finding the number of third resource elements allocated to all of the UCI, on the basis of the coding rate of the data; and multiplexing to a physical uplink shared channel (PUSCH) and sending to a base station the UCI, on the basis of the number of the third resource elements.

11 Claims, 19 Drawing Sheets

(51) Int. Cl.
*H04L 5/00* (2006.01)
*H04L 1/00* (2006.01)
*H04L 1/16* (2006.01)
*H04L 1/18* (2006.01)

(52) U.S. Cl.
CPC ............ *H04L1/0067* (2013.01); *H04L 1/0072* (2013.01); *H04L 1/0073* (2013.01); *H04L 1/1671* (2013.01); *H04L 1/1858* (2013.01); *H04L 5/0053* (2013.01)

(56) References Cited

U.S. PATENT DOCUMENTS

2011/0002290 A1    1/2011    Kim et al.
2011/0228759 A1    9/2011    Futagi et al.
2012/0113831 A1*    5/2012    Pelletier ................ H04L 5/0058 370/252

FOREIGN PATENT DOCUMENTS

| WO | WO 2010/082757 A2 | 7/2010 | |
|---|---|---|---|
| WO | WO 2010082757 A2 * | 7/2010 | ............ H04L 5/0037 |
| WO | WO 2010/148319 A1 | 12/2010 | |

OTHER PUBLICATIONS

3GPP TSG RAN WG1 Meeting #60bis, R1-101905, "UCI transmission on PUSCH with SU-MIMO", Nokia Siemens Networks, Nokia, Discussion and Decision, Beijing, P.R. China, Apr. 12-16, 2010, pp. 1-2.

* cited by examiner

FIG. 5
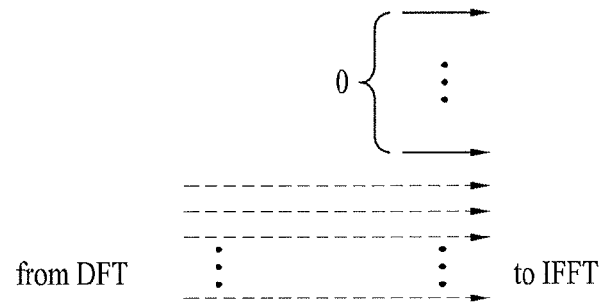
(a)
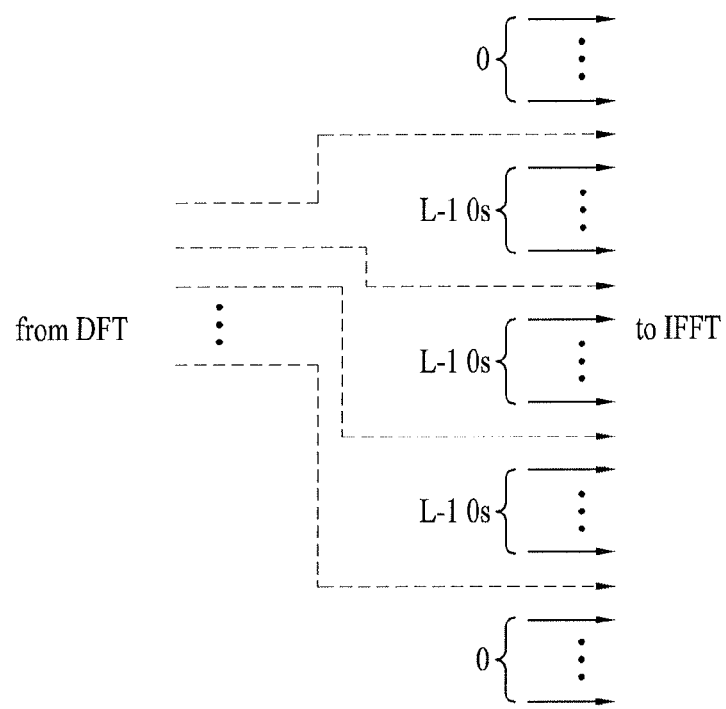
(b)

FIG. 6
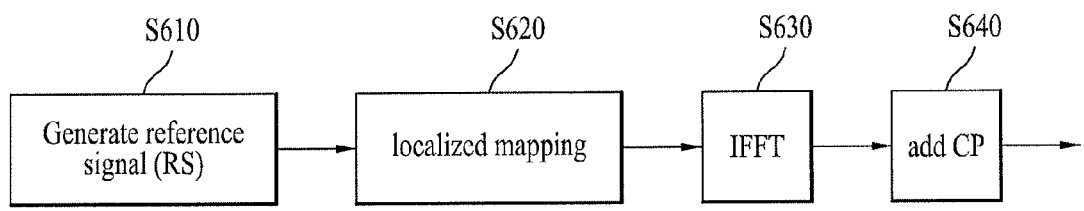
FIG. 7
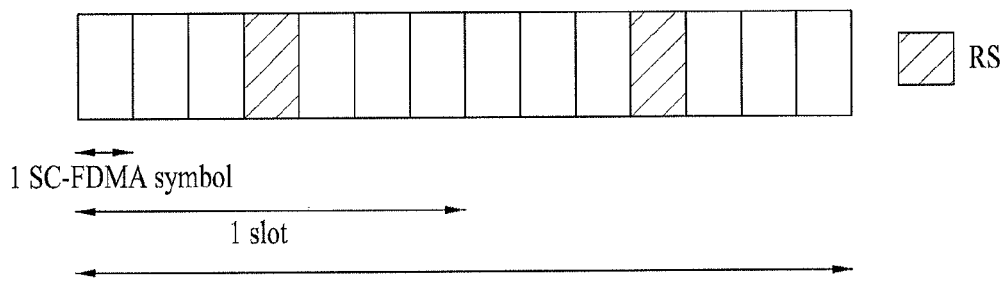
(a)
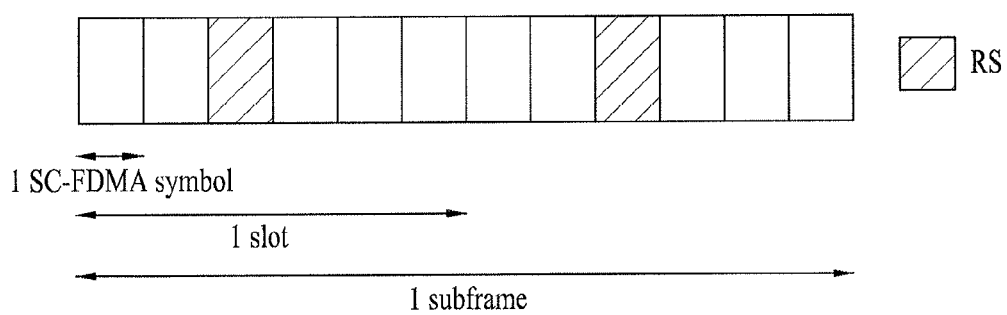
(b)

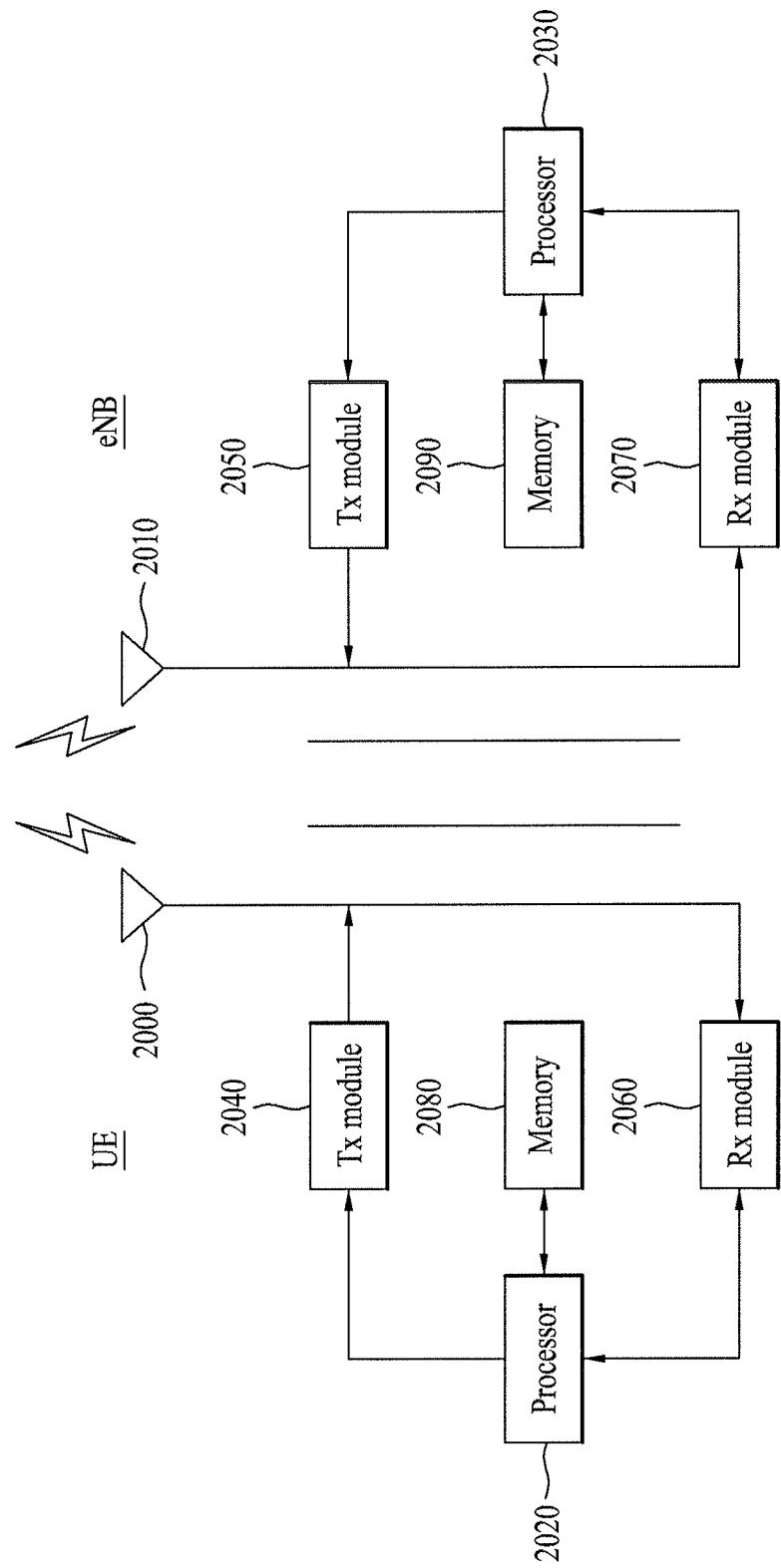

METHOD AND DEVICE FOR TRANSMITTING UPLINK CONTROL INFORMATION HAVING LARGE PAYLOAD IN WIRELESS ACCESS SYSTEM

CROSS REFERENCE TO RELATED APPLICATIONS

This application is the National Phase of PCT/KR 2012/003428 filed on May 2, 2012, which claims priority under 35 U.S.C. 119(e) to U.S. Provisional Application No. 61/481,700 filed on May 2, 2011, all of which are hereby expressly incorporated by reference into the present application.

TECHNICAL FIELD

The present invention relates to a wireless access system, and more particularly, to methods and apparatuses for transmitting Uplink Control Information (UCI) having a large payload size in a Carrier Aggregation (CA) environment (i.e. a multi-Component Carrier (multi-CC) environment).

BACKGROUND ART

A $3^{rd}$ Generation Partnership Project Long Term Evolution (3GPP LTE) system (conforming to Rel-8 or Rel-9) adopts Multi-Carrier Modulation (MCM) in which a single CC is divided into a plurality of frequency bands. On the other hand, a 3GPP LTE-Advanced system (hereinafter, referred to as an LTE-A system) may use CA by aggregating one or more CCs to support a broader system bandwidth than in the 3GPP LTE system. The term CA may be interchanged with carrier matching, multi-CC environment, or multi-carrier environment.

For a single-CC environment such as the LTE system, only multiplexing of UCI and data using a plurality of layers on one CC is specified.

When UCI is multiplexed with data, the number of symbols allocated to the UCI is determined by the coding rate of the data transmitted along with the UCI and a ratio between the data and the UCI in energy per information bit.

A relatively limited number of symbols are used to transmit UCI in the LTE system (i.e. Rel-8) because only one CC is used for an uplink. That is, there is no big difference in the coding rate of data between UCI transmission and UCI non-transmission, the coding rate of the data needed to calculate the number of symbols allocated to the UCI can be calculated on the assumption that the data occupies all resources allocated to a Physical Uplink Shares CHannel (PUSCH) in the LTE system.

In contrast, the LTE-A system being an evolution of the LTE system supports CA and thus a User Equipment (UE) and an evolved Node B (eNode B or eNB) may use up to five CCs simultaneously. The increased number of CCs leads to an increase in the size of UCI transmitted from the UE. As a consequence, the coding rate of data may be much different between a UCI transmission case and a UCI non-transmission case.

Particularly when UCI is transmitted on a PUSCH in the legacy LTE system, no regard is given to UCI having a large payload size because only methods for transmitting UCI in one CC have been defined.

With a UCI transmission method defined in the LTE system, UCI having a large payload size of up to 15 bits cannot be transmitted. Existing Reed-Muller (RM) coding is not viable for such a large payload size of UCI. Accordingly, there exists a need for developing a new method for transmitting UCI having a large information size in the LTE-A system.

DISCLOSURE

Technical Problem

An object of the present invention devised to solve the conventional problem is to provide methods for transmitting Uplink Control Information (UCI) having a large payload size.

Another object of the present invention is to provide a method for channel-encoding UCI having a large payload size and methods for allocating resources to the UCI, if the UCI is piggybacked (or multiplexed) to a Physical Uplink Shared CHannel (PUSCH).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention relates to a method and apparatuses for transmitting Uplink Control Information (UCI) having a large payload size in a Carrier Aggregation (CA) environment.

In an aspect of the present invention, a method for transmitting Uplink Control Information (UCI) having a large payload size in a wireless access system includes obtaining the number of first Resource Elements (REs) allocated to a Channel Quality Indicator (CQI) information to be included in the UCI, obtaining the number of second Resource Elements (REs) allocated to a Rank Indicator (RI) information to be included in the UCI, obtaining a coding rate of data transmitted along with the UCI according to the number of the first REs and the number of the second REs, obtaining the number of third REs allocated to the UCI based on the coding rate of the data, and transmitting the UCI to a Base Station (BS) by multiplexing the UCI into a Physical Uplink Shared CHannel (PUSCH) based on the number of the third REs. When the coding rate of the data is obtained, the number of fourth REs allocated to an ACKnowledgement/Negative ACKnowledgement (ACK/NACK) information to be included in the UCI is not considered, because the ACK/NACK is filled by puncturing data allocated to each codeword.

In another aspect of the present invention, a User Equipment (UE) for transmitting UCI having a large payload size in a wireless access system includes a transmission module configured to transmit a wireless signal, a reception module configured to receive a wireless signal, and a processor configured to support transmission of the UCI having the large payload size.

The processor obtains the number of first REs allocated to a CQI information to be included in the UCI, obtains the number of second REs allocated to an RI information to be included in the UCI, obtains a coding rate of data transmitted along with the UCI according to the number of the first REs and the number of the second REs, obtains the number of third REs allocated to the UCI based on the coding rate of the data, and transmits the UCI to a BS through the transmission module by multiplexing the UCI into a PUSCH based on the number of the third REs.

When the coding rate of the data is obtained, the processor does not consider the number of fourth REs allocated to an ACK/NACK information to be included in the UCI, because the ACK/NACK is filled by puncturing data allocated to each codeword.

According to the aspects of the present invention, if the UCI is multiplexed into the PUSCH, codeword-to-layer mapping may be performed on the UCI at a bit level, at the level of a vector sequence being allocated per modulation symbol, at the level of a bit stream having as many bits as required for modulation symbols allocated to one row in a channel interleaver, or at the level of a bit stream having as many bits as the number of columns in a channel interleaver.

The number of the first REs may be calculated by $$\frac{(O+L) \cdot \left(M_{sc}^{PUSCH\_initial} \cdot N_{Symb}^{PUSCH\_initial} - Q'_{RI}\right) \cdot \beta_{offset}^{CQI}}{\sum_{r=0}^{C-1} K_r + (O+L) \cdot \beta_{offset}^{CQI}}.$$

The number of the second REs may be calculated by $$\frac{O^{RI} \cdot \beta_{offset}^{RI} \cdot M_{sc}^{PUSCI\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} + \frac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L)\beta_{offset}^{CQI} + O^{RI} \cdot \beta_{offset}^{RI}}.$$

The number of the fourth REs may be calculated by $$\frac{O^{ACK} \cdot \beta_{offset}^{ACK} \cdot M_{sc}^{PUSCI\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} + \frac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L)\beta_{offset}^{CQI} + O^{RI} \cdot \beta_{offset}^{RI} + O^{ACK} \cdot \beta_{offset}^{ACK}}.$$

The afore-described aspects of the present invention are merely a part of embodiments of the present invention. Those skilled in the art will derive and understand various embodiments reflecting the technical features of the present invention from the following detailed description of the present invention.

Advantageous Effects

The embodiments of the present invention have the following effects.

Firstly, UCI having a large payload size can be transmitted without errors in a CA environment.

Secondly, if an ACKnowledgement/Negative ACKnowledgement (ACK/NACK) having large payload and a Rank Indicator (RI) having large payload are encoded using a plurality of Reed-Muller (RM) codes, the minimum number of Resource Elements (REs) for an ACK/NACK or RI having an information size equal to or larger than 3 bits or any other bit number is determined by each RM code. Therefore, information can be transmitted more robustly.

Thirdly, if an ACK/NACK having large payload and an RI having large payload are encoded using a plurality of RM codes, RM-coded data is punctured not sequentially but in a manner that offers the best performance. Thus when the data is punctured, better performance can be achieved.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings. That is, those skilled in the art will also understand unintended effects that can be achieved from implementation of the present invention from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates frequency-domain signal mapping methods that satisfy a single carrier property in the frequency domain;

FIG. 6 is a block diagram illustrating an operation for transmitting a Reference Signal (RS) for use in demodulating an SC-FDMA transmission signal;

FIG. 7 illustrates the positions of symbols to which RSs are mapped in an SC-FDMA subframe structure;

FIG. 20 is a block diagram of apparatuses that may implement the methods illustrated in FIGS. 1 to 19.

BEST MODE

Figure 1:
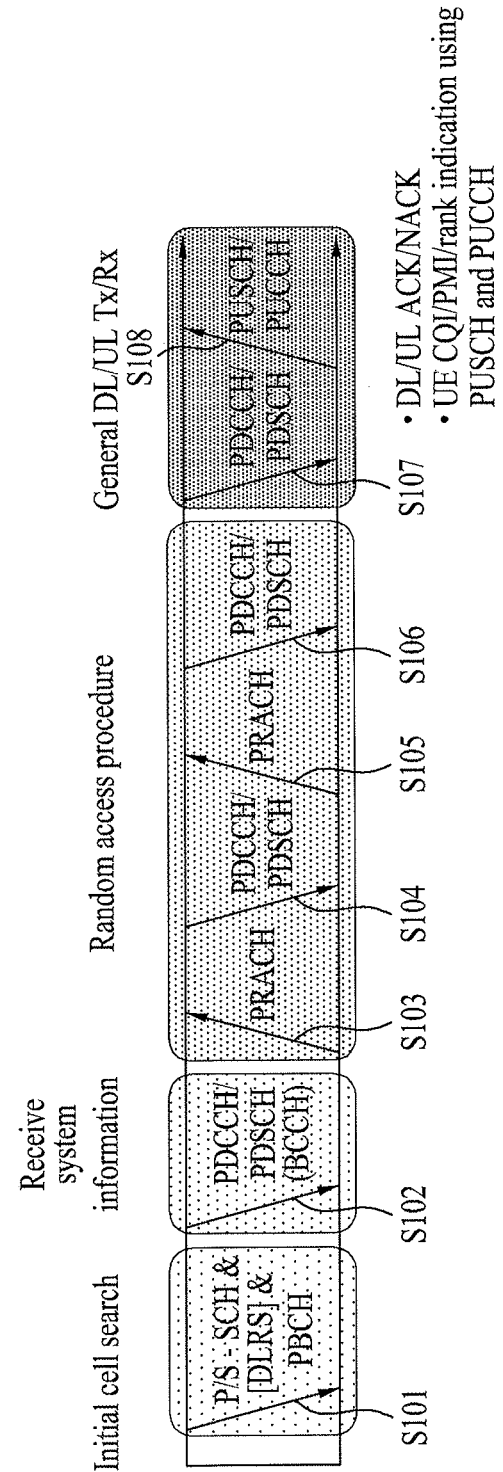
FIG. 1 illustrates physical channels and a general signal transmission method using the physical channels in a 3$^{rd}$ Generation Partnership Project Long Term Evolution (3GPP LTE) system.

Embodiments of the present invention relate to methods and apparatuses for transmitting Uplink Control Information (UCI) having a large payload size in a Carrier Aggregation (CA) environment (i.e. a multi-Component Carrier (multi-CC) environment).

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description has been mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an Advanced Base Station (ABS), an access point, etc.

The term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on UpLink (UL). Likewise, the UE may serve as a receiver and the BS may serve as a transmitter, on DownLink (DL).

The embodiments of the present invention may be supported by standard documents disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, a 3GPP LTE-Advanced (LTE-A) system, and a 3GPP2 system. In particular, the embodiments of the present invention may be supported by 3GPP TS 36.211, 3GPP TS 36.212, 3GPP TS 36.213, and 3GPP TS 36.321 documents. That is, the steps or parts, which are not described to clearly reveal the technical idea of the present invention, in the embodiments of the present invention may be explained by the above documents. All terms used in the embodiments of the present invention may be explained by the standard documents.

Reference will now be made in detail to the embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, and LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. Overview of 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general method for transmitting signals on the physical channels in the 3GPP system.

When a UE is powered on or enters a new cell, the UE performs initial cell search (S101). The initial cell search involves acquisition of synchronization to an eNB. Specifically, the UE synchronizes its timing to the eNB and acquires information such as a cell Identifier (ID) by receiving a Primary Synchronization CHannel (P-SCH) and a Secondary Synchronization CHannel (S-SCH) from the eNB.

Then the UE may acquire information broadcast in the cell by receiving a Physical Broadcast CHannel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control CHannel (PDCCH) and receiving a Physical Downlink Shared CHannel (PDSCH) based on information of the PDCCH (S102).

To complete access to the eNB, the UE may perform a random access procedure with the eNB (S103 to S106). In the random access procedure, the UE may transmit a preamble on a Physical Random Access CHannel (PRACH) (S103) and may receive a response message to the preamble on a PDCCH and a PDSCH associated with the PDCCH (S104). In the case of a contention-based random access, the UE may additionally perform a contention resolution procedure including transmission of an additional PRACH (S105) and reception of a PDCCH signal and a PDSCH signal corresponding to the PDCCH signal (S106).

After the above procedure, the UE may receive a PDCCH and/or a PDSCH from the eNB (S107) and transmit a Physical Uplink Shared CHannel (PUSCH) and/or a Physical Uplink Control CHannel (PUCCH) to the eNB (S108), in a general UL/DL signal transmission procedure.

Information that the UE transmits to the eNB is called UCI. The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, they may be transmitted on a PUSCH. In addition, UCI may be transmitted aperiodically on the PUSCH, upon receipt of a request/command from a network.

Figure 2:
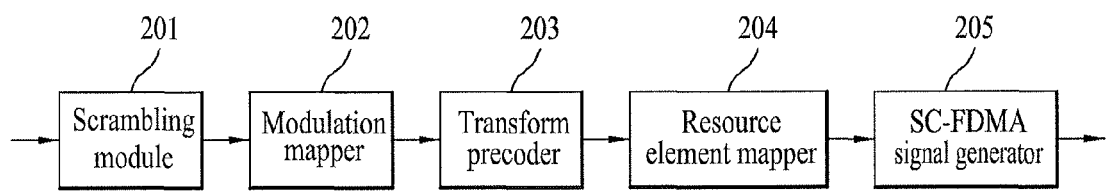
FIG. 2 illustrates a configuration of a User Equipment (UE) and a signal processing operation for transmitting an uplink signal in the UE.

FIG. 2 illustrates a configuration of a UE and a signal processing operation for transmitting a UL signal in the UE.

To transmit a UL signal, a scrambling module 210 of the UE may scramble the transmission signal with a UE-specific scrambling signal. A modulation mapper 220 modulates the scrambled signal to complex symbols in Binary Phase Shift Keying (BPSK), Quadrature Phase Shift Keying (QPSK), or 16-ary Quadrature Amplitude Modulation (16QAM)/64-ary QAM (64QAM) according to the type of the transmission signal and/or a channel state. After the complex symbols are processed in a transform precoder 203, a Resource Element (RE) mapper 240 may map the complex symbols to time-frequency REs. The processed signal may be transmitted to an eNB through an antenna, after being processed in an SC-FDMA signal generator 250.

Figure 3:
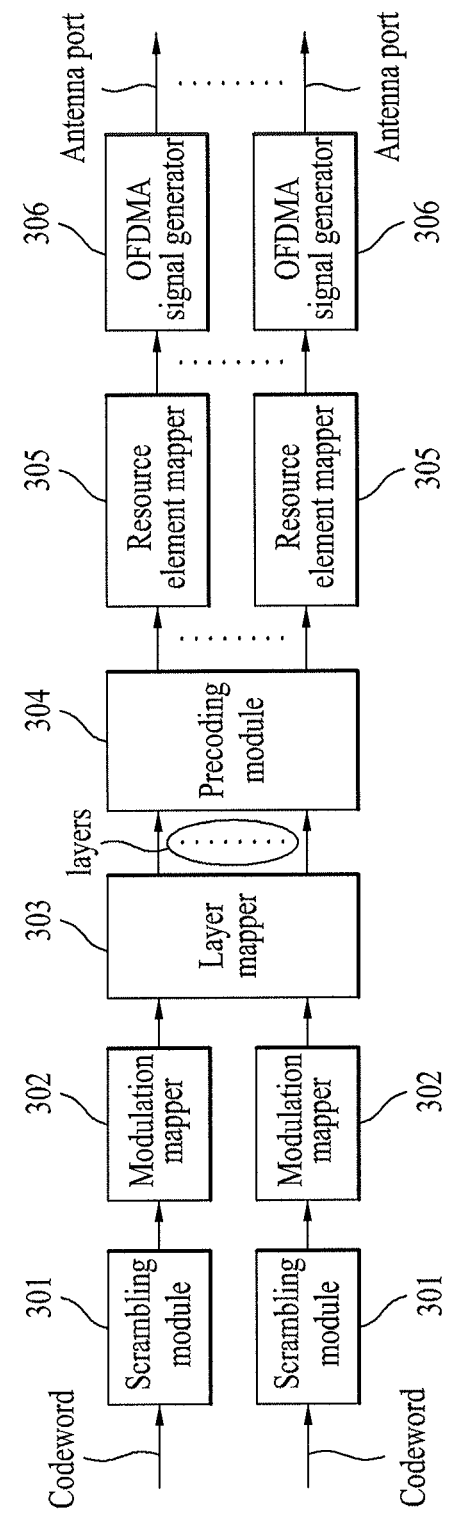
FIG. 3 illustrates a configuration of an evolved Node B (eNode B or eNB) and a signal processing operation for transmitting a downlink signal in the eNB.

FIG. 3 illustrates a configuration of an eNB and a signal processing operation for transmitting a DL signal in an eNB.

In the 3GPP LTE system, the eNB may transmit one or more codewords on a DL. Each codeword may be processed to complex symbols through a scrambling module 301 and a modulation mapper 302, as done for the UL in FIG. 2. A layer mapper 303 maps the complex symbols to a plurality of layers. A precoding module 304 may multiply each layer by a precoding matrix and allocate the multiplied layers to transmission antennas. RE mappers 305 may map the processed antenna-specific transmission signals to time-frequency REs and transmit the antenna-specific transmission signals through antennas after the antenna-specific transmission signals are processed in Orthogonal Frequency Division Multiplexing (OFDM) signal generators 306.

Compared to DL signal transmission from an eNB, a Peak-to-Average Power Ratio (PAPR) becomes a problem with UL signal transmission from a UE. As described before with reference to FIGS. 2 and 3, a UL signal is transmitted in SC-FDMA, while a DL signal is transmitted in OFDMA.

Figure 4:
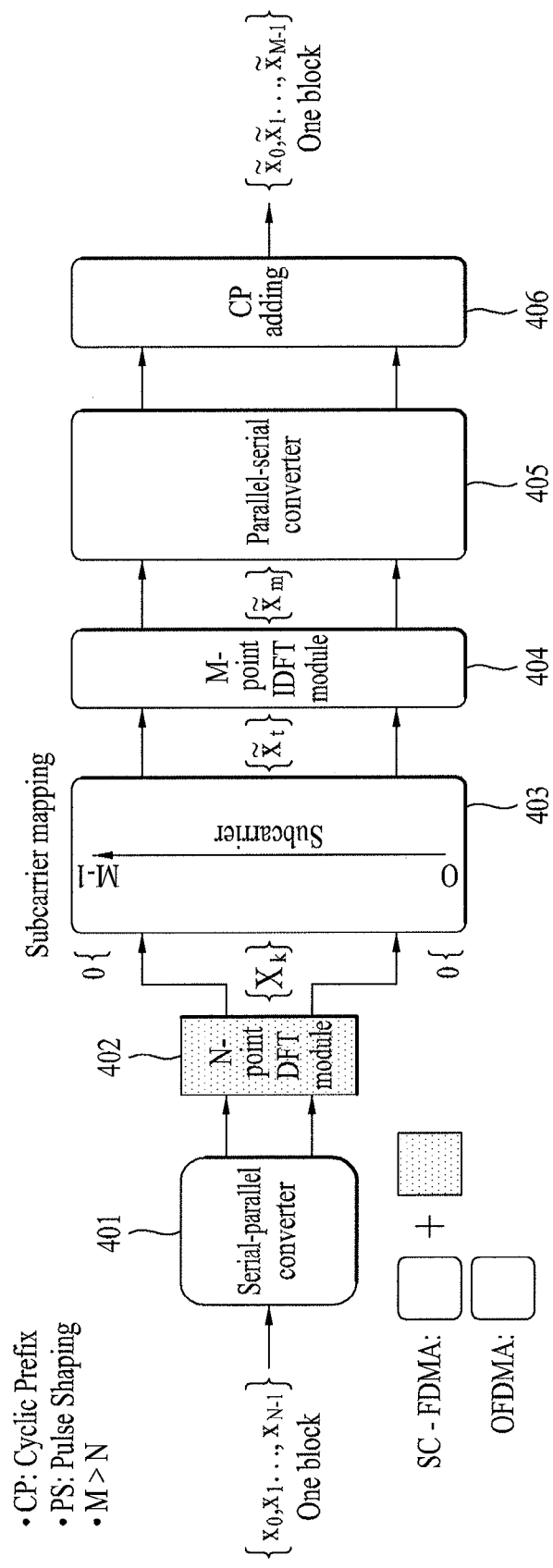
FIG. 4 illustrates a configuration of a UE and Single Carrier Frequency Division Multiple Access (SC-FDMA) and Orthogonal Frequency Division Multiple Access (OFDMA) schemes.

FIG. 4 illustrates a configuration of a UE and SC-FDMA and OFDMA schemes.

A 3GPP system (e.g. the LTE system) adopts OFDMA for DL and SC-FDMA for UL. Referring to FIG. 4, a UE and an eNB are common in that each of the UE and the eNB has a serial-to-parallel converter 401, a subcarrier mapper 403, an M-point Inverse Discrete Fourier Transform (IDFT) module 404, and a Cyclic Prefix (CP) adding module 406 in order to transmit a UL signal or a DL signal.

To transmit a signal in SC-FDMA, the UE further includes an N-point Discrete Fourier Transform (DFT) module 402. The N-point DFT module 402 nullifies the effects of IDFT of the IDFT module 404 to some extent so that the transmission signal takes a single carrier property.

FIG. 5 illustrates frequency-domain signal mapping methods that satisfy the single carrier property in the frequency domain.

FIG. 5(a) illustrates a localized mapping scheme and FIG. 5(b) illustrates a distributed mapping scheme. In clustered SC-FDMA being a modification of SC-FDMA, DFT output samples are divided into sub-groups and mapped to the frequency domain (or a subcarrier domain) non-continuously during subcarrier mapping.

FIG. 6 is a block diagram illustrating transmission of a Reference signal (RS) for use in demodulating a signal transmitted in SC-FDMA.

According to an LTE standard (e.g. 3GPP release 8), while a time signal of data is converted to a frequency signal by DFT, mapped to subcarriers, Inverse Fast Fourier Transform (IFFT)-processed, and then transmitted (refer to FIG. 4), an RS is generated directly in the frequency domain without DFT processing (S601), mapped to subcarriers (S602), IFFT-processed (S603), attached with a Cyclic Prefix (CP) (S640), and then transmitted.

FIG. 7 illustrates the positions of symbols to which RSs are mapped in an SC-FDMA subframe structure.

FIG. 7(a) illustrates a case where RSs are positioned in the fourth SC-FDMA symbol of each of two slots in a subframe, when a normal CP is used. FIG. 7(b) illustrates a case where RSs are positioned in the third SC-FDMA symbol of each of two slots in a subframe, when an extended CP is used.

Figure 8:
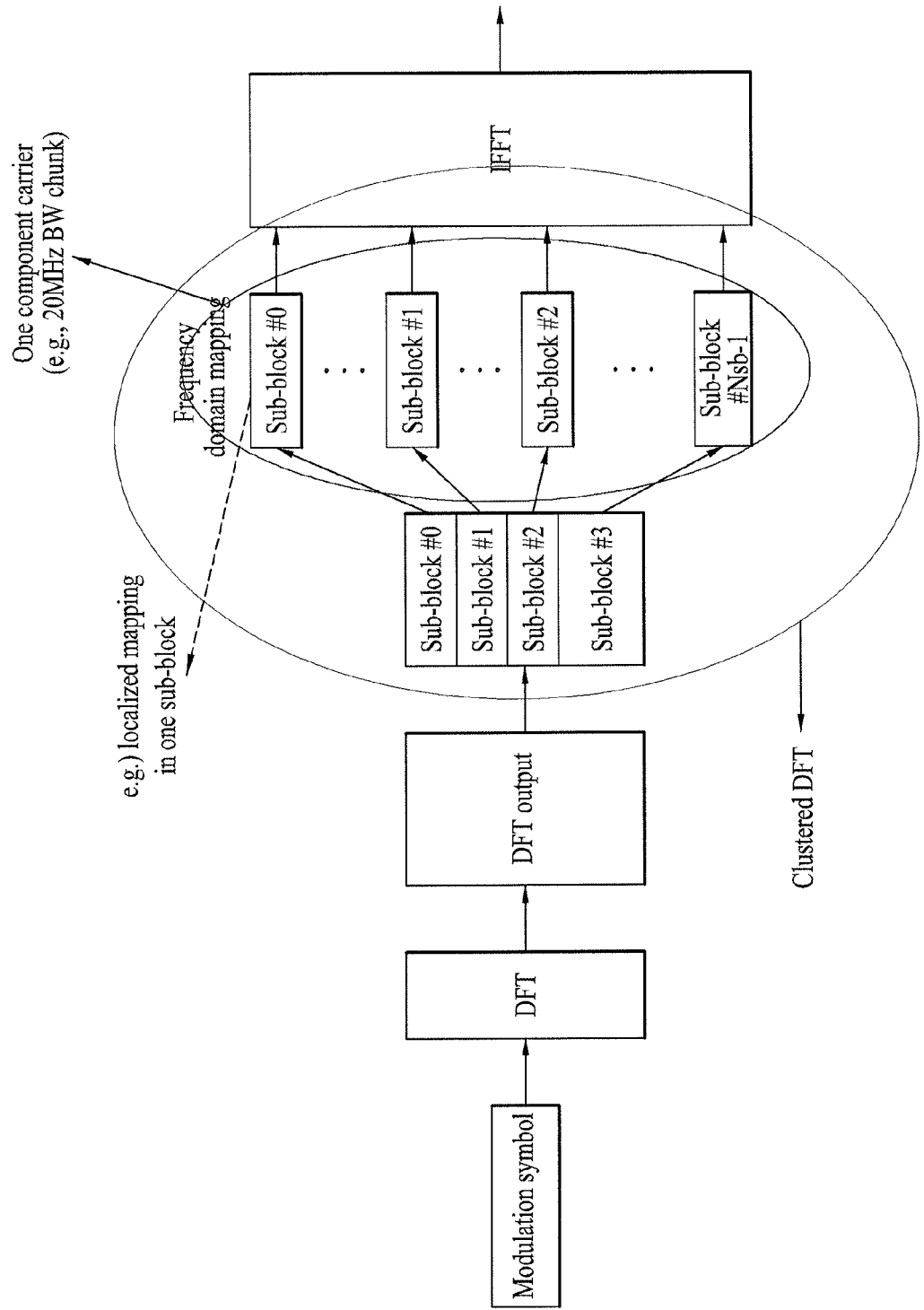
FIG. 8 illustrates a signal processing operation for mapping Discrete Fourier Transform (DFT) output samples to a single carrier in clustered SC-FDMA.
Figure 9:
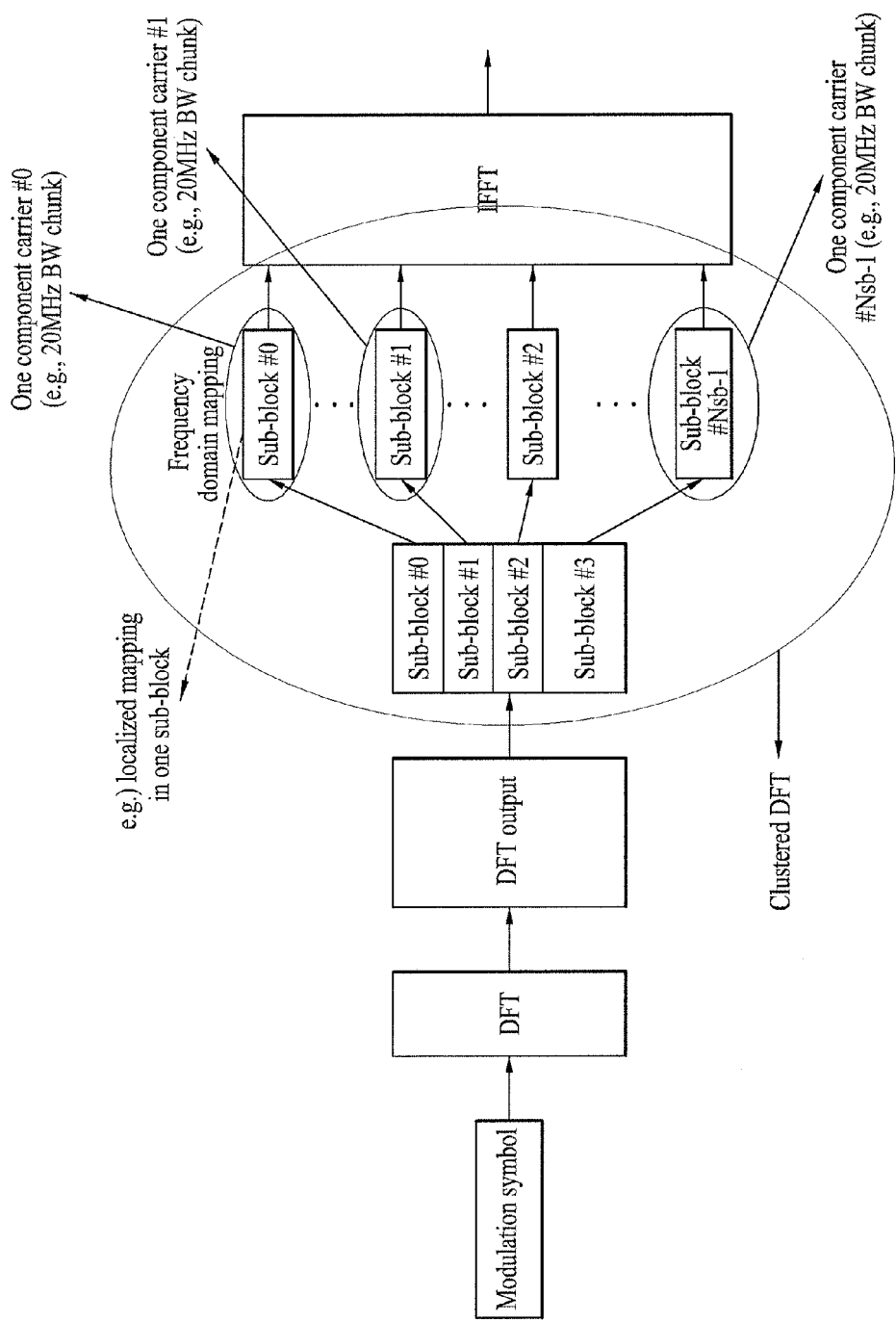
FIGS. 9 and 10 illustrate signal processing operations for mapping DFT output samples to multiple carriers in clustered SC-FDMA.
Figure 10:
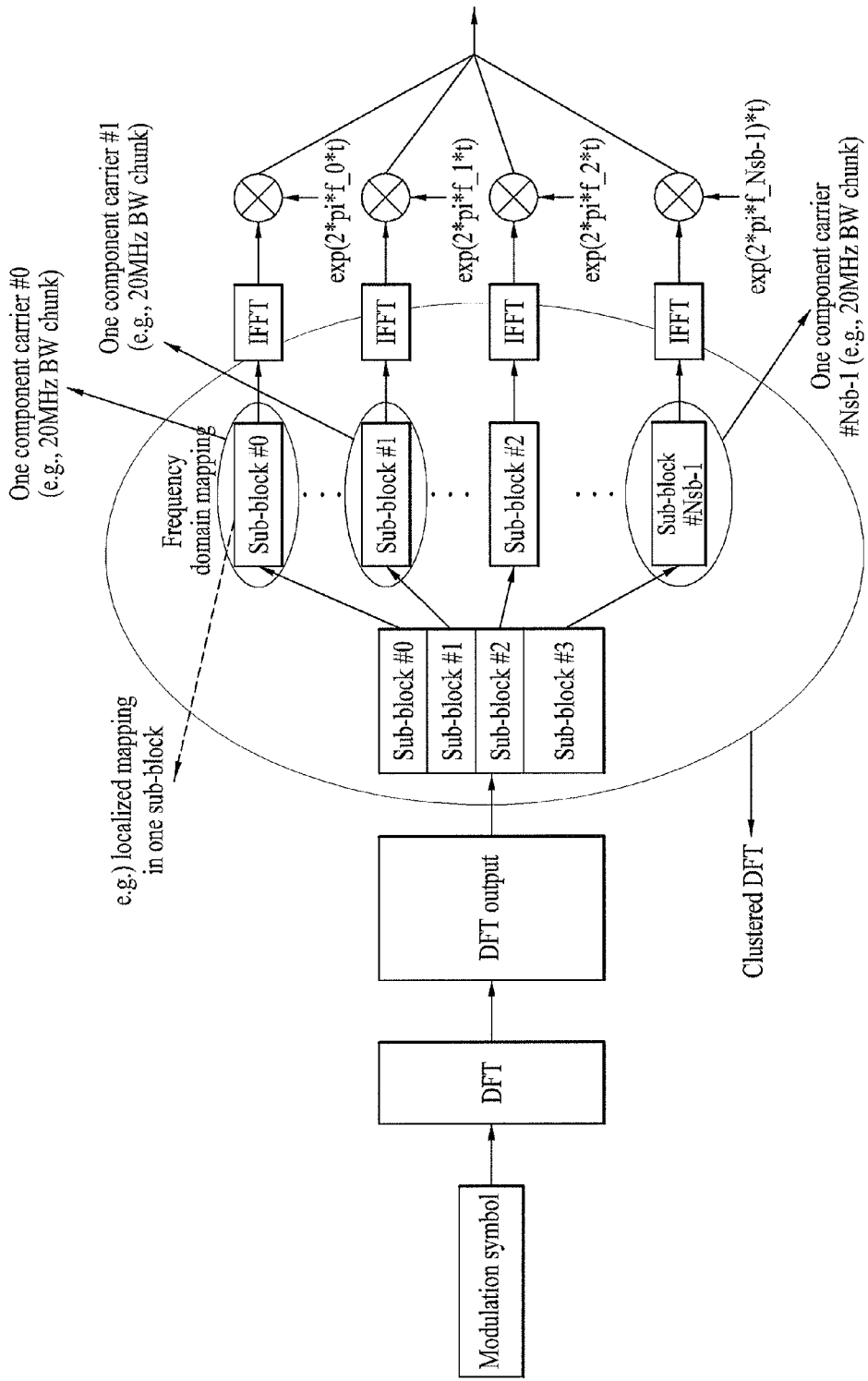

FIG. 8 illustrates a signal processing operation for mapping DFT output samples to a single carrier in clustered SC-FDMA. FIGS. 9 and 10 illustrate signal processing operations for mapping DFT output samples to multiple carriers in clustered SC-FDMA.

Figure 11:
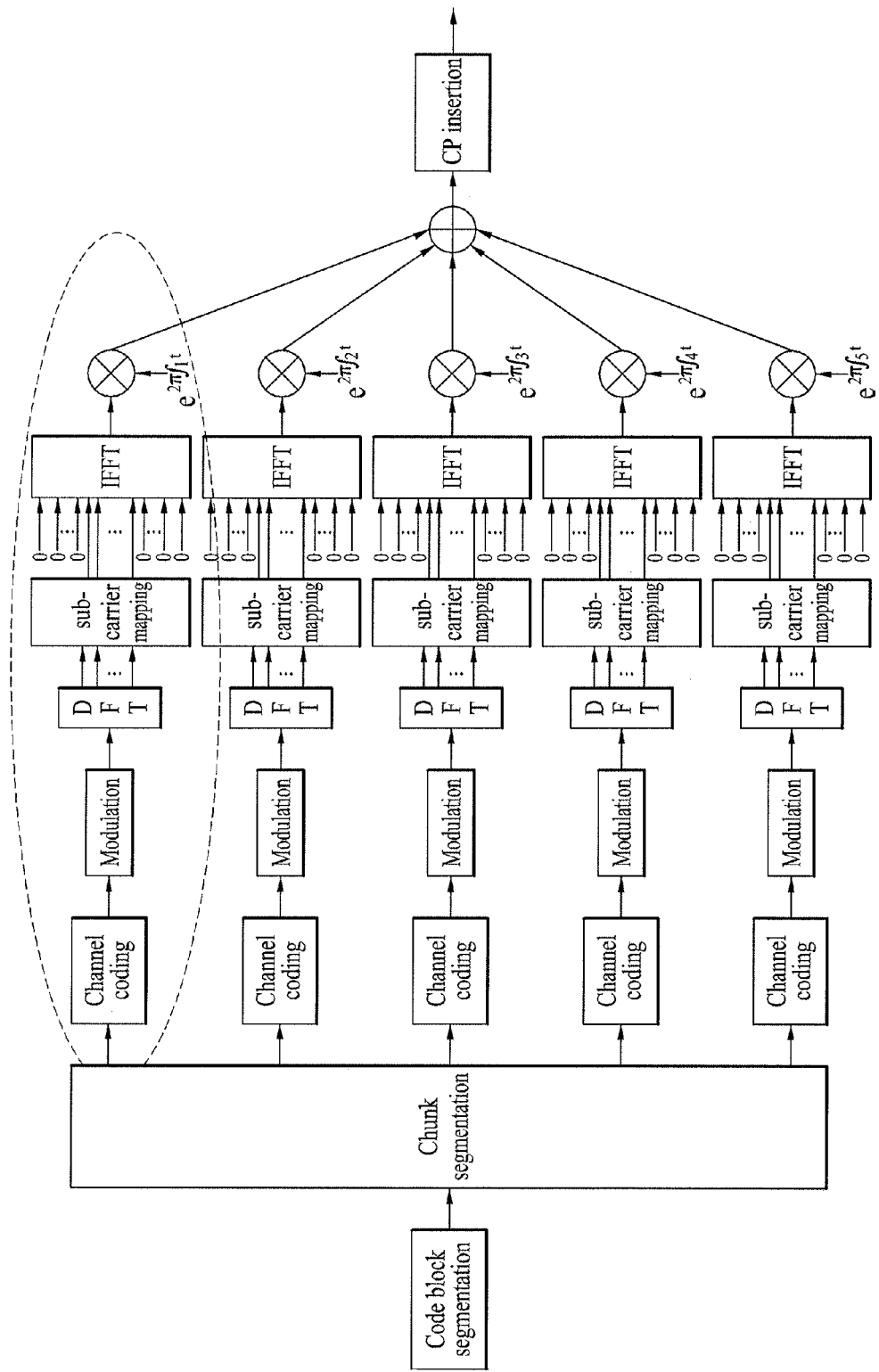
FIG. 11 illustrates a signal processing operation in segmented SC-FDMA.

FIG. 8 illustrates an example of intra-carrier clustered SC-FDMA and FIGS. 10 and 11 illustrate examples of inter-carrier SC-FDMA. In FIG. 9, with contiguous CCs allocated in the frequency domain, if a subcarrier spacing is aligned between adjacent CCs, a signal is generated from a single IFFT block. In FIG. 10, with non-contiguous CCs allocated in the frequency domain, signals are generated from a plurality of IFFT blocks.

FIG. 11 illustrates a segmented SC-FDMA signal processing operation.

In segmented SC-FDMA, as many IFFT modules as the number of DFT modules are used. Since DFT modules are mapped to IFFT modules in a one-to-one correspondence, segmented SC-FDMA is an extension of the DFT spreading and IFFT frequency subcarrier mapping configuration of the legacy SC-FDMA, also referred to as NxSC-FDMA or NxDFT-s-OFDMA. Herein, NxSC-FDMA and NxDFT-s-OFDMA are uniformly called segmented SC-FDMA. Referring to FIG. 11, to relieve the single carrier property constraint, total time-domain modulation symbols are grouped into N groups (N is an integer larger than 1) and DFT-processed on a group basis in segmented SC-FDMA.

Figure 12:
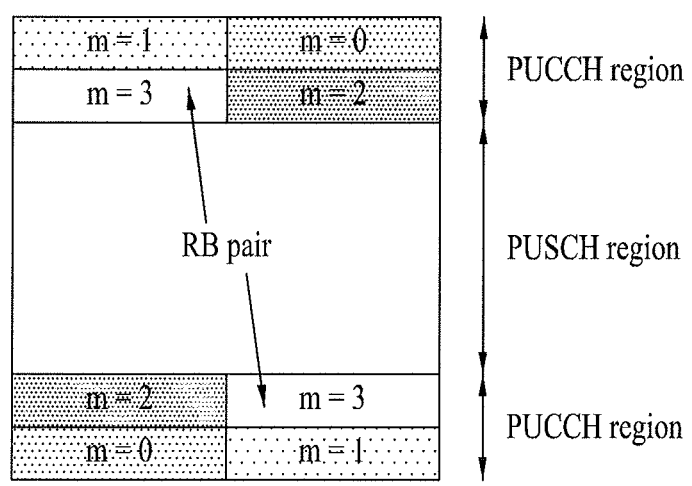
FIG. 12 illustrates an exemplary uplink subframe structure that may be used in embodiments of the present invention.

FIG. 12 illustrates an exemplary UL subframe structure that may be used in embodiments of the present invention.

Referring to FIG. 12, a UL subframe includes a plurality of (e.g. 2) slots. A slot may include a different number of SC-FDMA symbols according to a CP length. For example, a slot may include 7 SC-FDMA symbols in the case of a normal CP.

The UL subframe is divided into a data region and a control region. A PUSCH signal is transmitted and received in the data region. The data region is also used to transmit a UL data signal such as voice. A PUCCH signal is transmitted and received in the control region. The control region is also used to transmit UCI.

The PUCCH includes an RB pair (e.g. m=0, 1, 2 and 3) at both ends of the data region on the frequency axis. The PUCCH includes an RB pair at opposite ends (e.g. a frequency-mirrored RB pair) on the frequency axis and hops over a slot boundary. UCI includes an HARQ ACK/NACK, a CQI, a PMI, an RI, etc.

Figure 13:
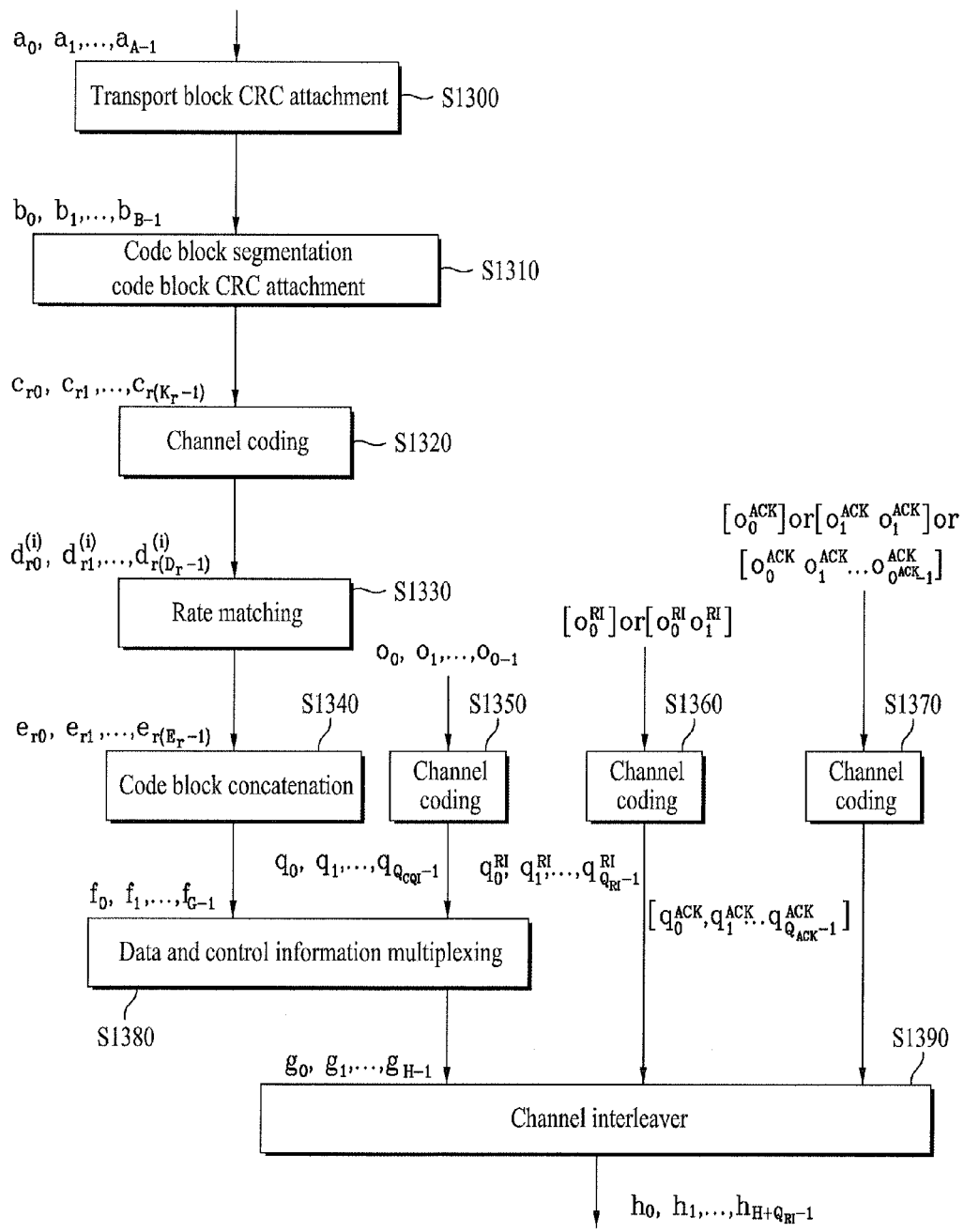
FIG. 13 illustrates an exemplary operation for processing UpLink-Shared CHannel (UL-SCH) data and control information, which may be used in embodiments of the present invention.

FIG. 13 illustrates an exemplary operation for processing UL-SCH data and control information, which may be used in embodiments of the present invention.

Referring to FIG. 13, UL-SCH data is transmitted in one Transport Block (TB) per Transmission Time Interval (TTI) to a coding unit.

Parity bits $p_0, p_1, p_2, p_3, \ldots, p_{L-1}$ are added to TB bits $a_0, a_0, a_1, a_2, a_3, \ldots, a_{A-1}$ received from a higher layer. The size of the TB is A and the number of parity bits, L is 24. Input bits attached with CRC bits as an error detection code may be expressed as $b_0, b_1, b_2, b_3, \ldots, b_{B-1}$ where B is the number of TB bits including the CRC (S1300).

The bits $b_0, b_1, b_2, b_3, \ldots, b_{B-1}$ are segmented into a plurality of Code Blocks (CBs) according to the TB size and each CB is attached with a CRC. The resulting bits are $c_{r0}, c_{r1}, c_{r2}, c_{r3}, \ldots, c_{r(K_r-1)}$ where r is the index of a CB (r=0, ..., C−1), $K_r$ is the number of bits in CB r, and C is the total number of CBs (S1310).

A channel coding unit channel-encodes the bits $c_{r0}, c_{r1}, c_{r2}, c_{r3}, \ldots, c_{r(K_r-1)}$ to $d_{r0}^{(i)}, d_{r1}^{(i)}, d_{r2}^{(i)}, d_{r3}^{(i)}, \ldots, d_{r(D_r-1)}^{(i)}$ where i is the index of a coded data stream (i=0, 1, 2), $D_r$ is the number of bits in an $i^{th}$ coded data stream for CB r (i.e. $D_r=K_r+4$), r is the index of a CB (r=0, 1, ..., C−1), $K_r$ is the number of bits in CB r, and C is the total number of CBs. In embodiments of the present invention, each CB may be channel-encoded in Turbo coding (S1320).

After the channel encoding, rate matching is performed. The rate-matched bits are $e_{r0}, e_{r1}, e_{r2}, e_{r3}, \ldots$, where $e_{r(E_r-1)}$ is the number of rate-matched bits in CB r, r=0, 1, ..., C−1, and C is the total number of CBs (S1330).

CB concatenation follows the rate matching. The CB-concatenated bits are $f_0, f_1, f_2, f_3, \ldots, f_{G-1}$ where G is the total number of coded bits. If control information is multiplexed with the UL-SCH data, prior to transmission, the bits of the control information are not included in G. $f_0, f_1, f_2, f_3, \ldots, f_{G-1}$ are a UL-SCH codeword (S1340).

Channel quality information (a CQI and/or a PMI), an RI, and an HARQ ACK as UCI are channel-encoded independently (S1350, S1360, and S1370). Each piece of the UCI is channel-encoded based on the number of code symbols for the control information. For example, the number of code symbols may be used in rate-matching the coded control information. The number of code symbols corresponds to the number of modulation symbols, the number of REs, etc. in subsequent operations.

An input CQI bit sequence $o_0, o_1, o_2, o_3, \ldots, o_{O-1}$ is channel-encoded to $q_0, q_1, q_2, q_3, \ldots, q_{Q_{CQI}-1}$ (S1350). The CQI is channel-encoded in a different coding scheme according to the number of bits. In addition, if the CQI has 11 or more bits, it is attached with 8 CRC bits. $Q_{CQI}$ is the total number of CQI coded bits. To match the length of the CQI bit sequence to $Q_{CQI}$, the coded CQI bits may be rate-matched. $Q_{CQI}=Q'_{CQI} \times Q_m$ where $Q'_{CQI}$ is the number of CQI code symbols and $Q_m$ is a modulation order for the CQI. $Q_m$ is equal to the modulation order of the UL-SCH data.

An input RI sequence $[o_0^{RI}]$ or $[o_0^{RI} o_1^{RI}]$ is channel-encoded (S1360). $[o_0^{RI}]$ and $[o_0^{RI} o_1^{RI}]$ are a 1-bit RI and a 2-bit RI, respectively.

The 1-bit RI is subject to repetition coding. The 2-bit RI is encoded with a (3, 2) simplex code and the RI coded data may be cyclically repeated. An RI having 3 to 11 bits is encoded with a (32, O) RM code used for the UL-SCH. For an RI having 12 or more bits, RI information is divided into two groups and each group is encoded with the (32, O) RM code in a double RM structure. An output RI bit sequence $q_0^{RI}, q_1^{RI}, q_2^{RI}, \ldots, q_{Q_{RI}-1}^{RI}$ is obtained by concatenating an RI CB(s). Herein, $Q_{RI}$ is the total number of RI coded bits. To match the length of the coded RI bits to $Q_{RI}$, the last concatenated RI CB may be a part (i.e. rate matching). $Q_{RI}=Q'_{RI} \times Q_m$ where $Q'_{RI}$ is the number of RI code symbols and $Q_m$ is a modulation order for the RI. $Q_m$ is equal to the modulation order of the UL-SCH data.

An input HARQ-ACK bit sequence $[o_0^{ACK}]$, $[o_0^{ACK} o_1^{ACK}]$ or $[o_0^{ACK} o_1^{ACK} \ldots o_{O^{ACK}-1}^{ACK}]$ is channel-encoded. $[o_0^{ACK}]$ and $[o_0^{ACK} o_1^{ACK}]$ are a 1-bit HARQ-ACK and a 2-bit HARQ-ACK, respectively. $[o_0^{ACK} o_1^{ACK} \ldots o_{O^{ACK}-1}^{ACK}]$ is an HARQ-ACK having more than 2 bits (i.e. $O^{ACK}>2$).

An ACK is encoded to 1 and a NACK is encoded to 0. The 1-bit HARQ-ACK is subject to repetition coding. The 2-bit HARQ-ACK is encoded with a (3, 2) simplex code and then may be cyclically repeated. An HARQ-ACK having 3 to 11 bits is encoded with the (32, O) RM code used for the UL-SCH. For an HARQ-ACK having 12 or more bits, HARQ-ACK information is divided into two groups and each group is encoded with the (32, O) RM code in a double RM structure. $Q_{ACK}$ is the total number of HARQ-ACK coded bits. $q_0^{ACK}, q_1^{ACK}, q_2^{ACK}, \ldots, q_{Q_{ACK}-1}^{ACK}$ is obtained by concatenating an HARQ-ACK CB(s). To match the length of the HARQ-ACK bit sequence to $Q_{ACK}$, the last concatenated HARQ-ACK CB may be a part (i.e. rate matching). $Q_{ACK}=Q'_{ACK} \times Q_m$ were $Q'_{ACK}$ is the number of HARQ-ACK code symbols and $Q_m$ is a modulation order for the HARQ-ACK. $Q_m$ is equal to the modulation order of the UL-SCH data.

A data/control multiplexing block receives the UL-SCH coded bits $f_0, f_1, f_2, f_3, \ldots, f_{G-1}$ and the CQI/PMI coded bits $q_0, q_1, q_2, q_3, \ldots, q_{Q_{CQI}-1}$ (S1380). The data/control multiplexing block outputs bits $g_0, g_1, g_2, g_3, \ldots, g_{H'-1}$ where $g_i$ is a column vector of length $Q_m$ (i=0, ..., H'−1). $g_i$ is a column vector of length $(Q_m \cdot N_L)$. $H=(G+N_L \cdot Q_{CQI})$ and $H'=H/(N_L \cdot Q_m)$ where $N_L$ is the number of layers to which a UL-SCH TB is mapped, and H is the total number of coded bits allocated for UL-SCH data and CQI/PMI information in the $N_L$ transmission layers to which the TB is mapped. Herein, H is the total number of coded bits allocated to the UL-SCH data and the CQI/PMI.

A channel interleaver channel-interleaves input coded bits. The input of the channel interleaver is the output of the data/control multiplexing block, $g_0, g_1, g_2, \ldots, g_{H'-1}$, the coded RI $q_0^{RI}, q_1^{RI}, q_2^{RI}, \ldots, q_{Q'_{RI}-1}^{RI}$, and the coded HARQ-ACK $q_0^{ACK}, q_1^{ACK}, q_2^{ACK}, \ldots, q_{Q'_{ACK}-1}^{ACK}$ (S1390).

In step S1390, $\underline{g}_i$ is the column vector of the CQI/PMI length $Q_m$ and i=0, . . . , H'−1 (H'=H/$Q_m$). $\underline{q}_i^{ACK}$ is the column vector of the ACK/NACK length $Q_m$ and i=0, . . . , $Q'_{ACK}$−1 ($Q'_{ACK}$=$Q_{ACK}$/$Q_m$). $\underline{q}_i^{RI}$ is the column vector of the RI length $Q_m$ and i=0, . . . , $Q'_{RI}$−1 ($Q'_{RI}$=$Q_{RI}$/$Q_m$).

The channel interleaver multiplexes the control information with and/or the UL-SCH data, for transmission on a PUSCH. Specifically, the channel interleaver maps the control information and the UL-SCH data to a channel interleaver matrix corresponding to PUSCH resources.

After the channel interleaving, a bit sequence $h_0$, $h_1$, $h_2$, . . . , $h_{H+Q_{RI}-1}$ is output from the channel interleaver matrix column by column. The interleaved bit sequence is mapped to a resource grid.

Figure 14:
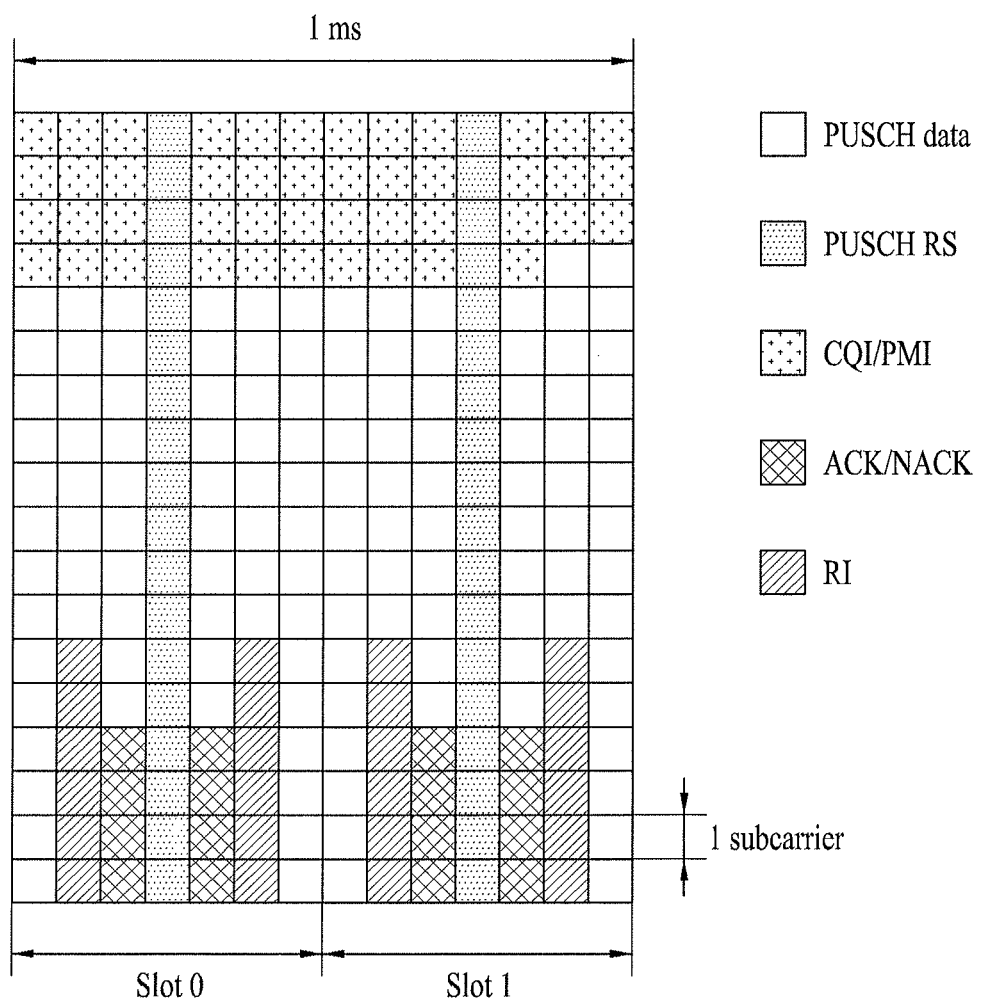
FIG. 14 illustrates an exemplary method for multiplexing UCI and UL-SCH data into a Physical Uplink Shared CHannel (PUSCH)

FIG. 14 illustrates an exemplary method for multiplexing UCI and UL-SCH data into a PUSCH.

When a UE transmits control information in a subframe to which PUSCH transmission is allocated, the UE multiplexes UCI with UL-SCH data before DFT spreading. The UCI includes at least one of a CQI/PMI, an HARQ-ACK/NACK, and an RI.

The number of REs used for transmission of each of the CQI/PMI, the HARQ-ACK/NACK, and the RI is determined based on a Modulation and Coding Scheme (MCS) for PUSCH transmission and an offset value ($\Delta_{offset}^{CQI}$, $\Delta_{offset}^{HARQ-ACK}$, or $\Delta_{offset}^{RI}$). An offset value allows a different coding rate according to control information and is set semistatically by higher-layer signaling (e.g. Radio Resource Control (RRC) signaling). The UL-SCH data and the control information are mapped to different REs. The control information is mapped across the two slots of a subframe. Because an eNB has prior knowledge of transmission of control information on a PUSCH, it may readily demultiplex control information and a data packet.

Referring to FIG. 14, CQI and/or PMI (CQI/PMI) resources are located at the start of UL-SCH data resources. After a CQI/PMI is mapped sequentially to all SC-FDMA symbols of one subcarrier, it is mapped to another subcarrier. The CQI/PMI is mapped from left to right, that is, in an ascending order of SC-FDMA symbol indexes on a subcarrier. PUSCH data (UL-SCH) data is rate-matched in consideration of the amount of the CQI/PMI resources (i.e. the number of CQI/PMI code symbols). The same modulation order applies to the UL-SCH data and the CQI/PMI.

For example, if the size of CQI/PMI information (the payload size of the CQI/PMI) is small (e.g. 11 or fewer bits), the CQI/PMI information may be encoded with a (32, k) block code, like PUCCH data transmission, and the coded CQI/PMI data may be cyclically repeated. A CRC is not used for a CQI/PMI having a small information size.

If the CQI/PMI information size is large (e.g. more than 11 bits), the CQI/PMI information is attached with an 8-bit CRC, channel-encoded with a trail-biting convolution code, and then rate-matched. An ACK/NACK is inserted into a part of SC-FDMA resources to which the UL-SCH data is mapped by puncturing. The ACK/NACK is adjacent to RSs. In a corresponding SC-FDMA symbol, the ACK/NACK is filled from bottom to top, that is, in an ascending order of subcarrier indexes.

In the case of a normal CP, the ACK/NACK resides in SC-FDMA symbol #2/#4 in each slot, as illustrated in FIG. 14. A coded RI is located in a symbol (i.e. symbol #1/#5) adjacent to the ACK/NACK symbol irrespective of whether the ACK/NACK is actually transmitted in a subframe. The ACK/NACK, the RI, and the CQI/PMI are encoded separately.

Figure 15:
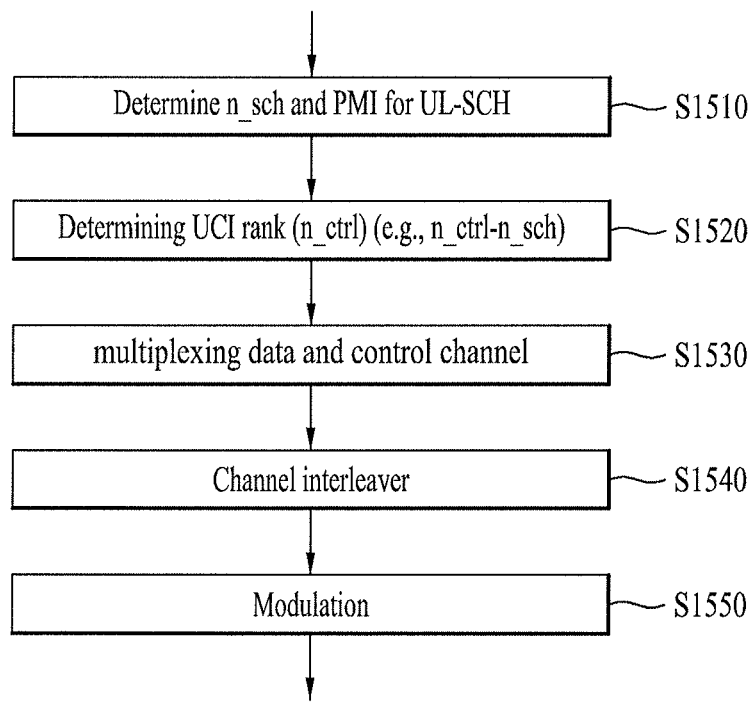
FIG. 15 illustrates multiplexing of control information and UL-SCH data in a Multiple Input Multiple Output (MIMO) system.

FIG. 15 illustrates multiplexing of control information and UL-SCH data in a Multiple Input Multiple Output (MIMO) system.

Referring to FIG. 15, a UE determines a rank n_sch and its related PMI for a UL-SCH (a data part) based on scheduling information configured for PUSCH transmission (S1510). In addition, the UE determines a rank n_ctrl for UCI (S1520). The rank of the UCI may be, but not limited to, equal to that of the UL-SCH (n_ctrl=n_sch). Subsequently, the data is multiplexed with the control channel (S1530). A channel interleaver performs time-first mapping on data/CQI and maps an ACK/NACK/RI by puncturing REs near to Demodulation RSs (DM-RSs) (s1540). The data and the control channel are modulated, referring to an MCS table (S1550). For example, QPSK, 16QAM, or 64QAM is available as a modulation scheme for the data and the control channel. The order/position of a modulation block may be changed (e.g. before multiplexing the data and the control channel).

Figure 16:
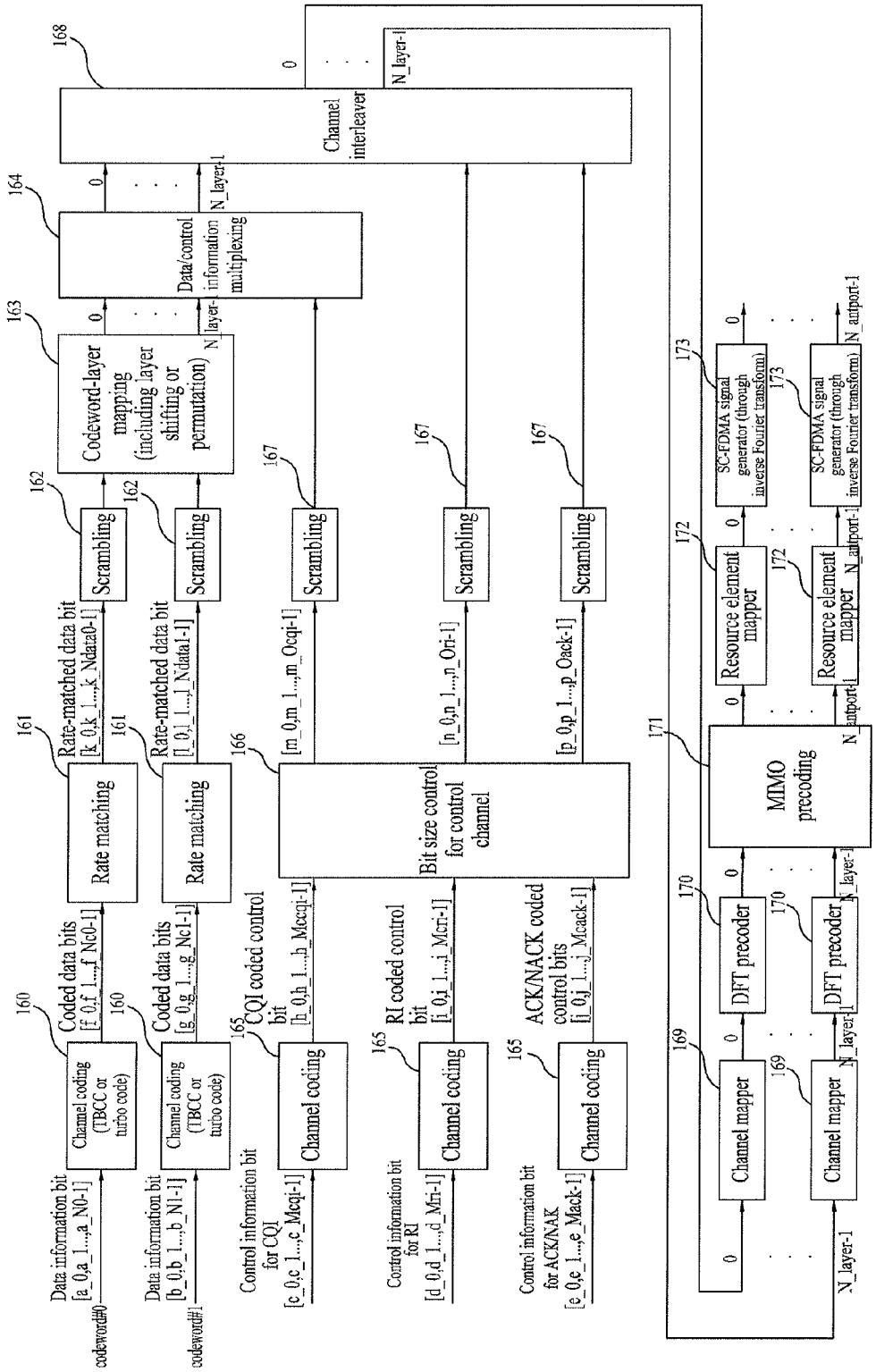
FIGS. 16 and 17 illustrate an exemplary method for multiplexing a plurality of UL-SCH transport blocks with UCI and transmitting the multiplexed signal in a UE according to an embodiment of the present invention.
Figure 17:
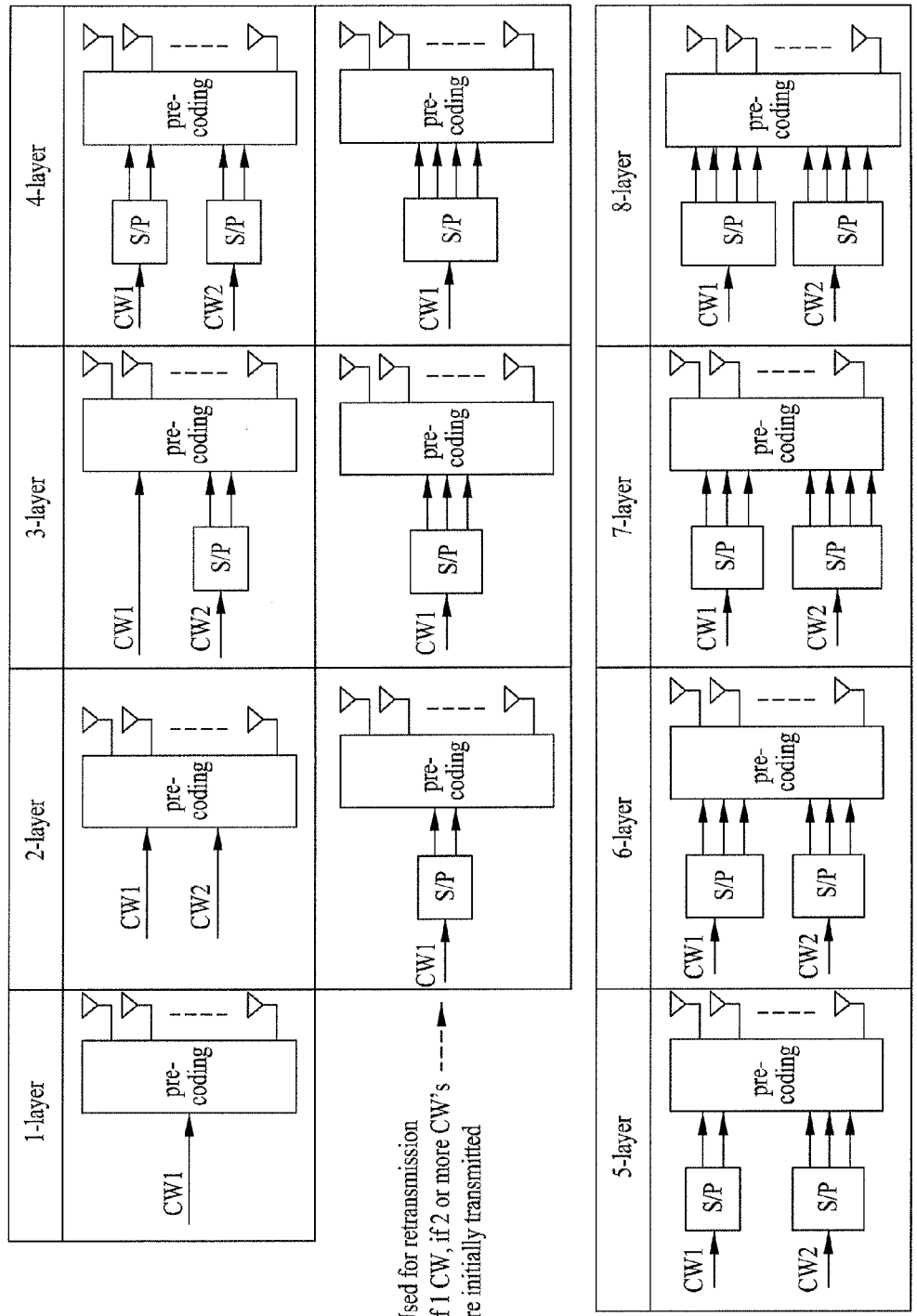

FIGS. 16 and 17 illustrate an exemplary method for multiplexing a plurality of UL-SCH TBs with UCI and transmitting the multiplexed signal in a UE according to an embodiment of the present invention.

For the convenience of description, it is assumed in FIGS. 16 and 17 that two codewords are transmitted. However, FIGS. 16 and 17 may apply to transmission of one codeword or three or more codewords. A codeword and a TB are equivalent and these terms are interchangeably used herein. The basic operation for multiplexing UL-SCH data with control information and transmitting the multiplexed signal is performed in the same manner as or in a similar manner to FIGS. 13 and 14. Therefore, the following description focuses on a MIMO-related part.

In FIG. 16, in the case where two codewords are transmitted, the codewords are channel-encoded separately (160) and rate-matched according to a given MCS level and resource size (161). The coded bits may be scrambled cell-specifically, UE-specifically, or codeword-specifically (162). Then the codewords are mapped to layers (163). The codeword to layer mapping may involve layer shifting or permutation.

The function block 163 may map codewords to layers in the manner illustrated in FIG. 17. Precoding positions of FIG. 17 may be different from the precoding positions of FIG. 13.

With continued reference to FIG. 16, control information such as a CQI, an RI, and an ACK/NACK is channel-encoded in channel encoders 165 according to a given specification. For the CQI, the RI, and the ACK/NACK, the same channel code may be used in encoding every codeword or a different channel code may be used in encoding each codeword.

The number of the coded bits of the control information may be changed by a bit size controller 166. The bit size controller 166 may be incorporated into the channel encoders 165. A signal output from the bit size controller 166 is scrambled (167). The scrambling may be cell-specific, layer-specific, codeword-specific, or UE-specific.

The bit size controller 166 may operate in the following manner.

(1) The bit size controller recognizes the rank of PUSCH data, n_rank_pusch.

(2) The rank of a control channel, n_rank_control is set to be equal to that of the data (i.e. n_rank_control=n_rank_pusch) and the number of bits of the control channel, n_bit_ctrl is increased by multiplying it by the rank of the control channel.

One of methods for performing this operation is to simply repeat the control channel by copying it. The control channel may be at an information level before channel coding or at a coded bit level after channel coding. For example, if a control channel with n_bit_ctrl=4 is [a0, a1, a2, a3] and n_rank_pusch=2, the increased number of bits of the control channel, n_ext_ctrl may be 8 by extending the control channel to [a0, a1, a2, a3, a0, a1, a2, a3].

In another method, a circular buffer may be used to set the number of extended bits of the control channel, n_ext_ctrl to 8.

If the bit size controller 166 is incorporated with the channel encoders 165, the coded bits of the control information may be generated using channel coding and rate matching defined in the legacy system (e.g. LTE Rel-8).

To achieve further randomization of each layer, bit-level interleaving may be performed in addition to the operation of the bit size controller 166. Or modulation symbol-level interleaving may be performed equivalently.

The CQI/PMI channel and the control information (or control data) about the two codewords may be multiplexed in a data/control multiplexer 164. Then, a channel interleaver 168 maps the ACK/NACK information to REs adjacent to UL DM-RSs in each of the two slots of a subframe, while mapping the CQI/PMI to REs in a time-first mapping scheme.

Subsequently, modulation mappers 169 modulate the respective layers. The modulated data is subject to DFT precoding in DFT precoders 170 and MIMO precoding in a MIMO precoder 171, and then mapped sequentially to REs in RE mappers 172. SC-FDMA signal generators 173 generate SC-FDMA signals and transmit the generated control signals through antenna ports.

The above-described functional blocks are not limited to the positions illustrated in FIG. 16 and may be changed in position, when needed. For example, the scramblers 162 and 167 may reside after the channel interleaver 168. Further, the codeword to layer mapper 163 may reside after the channel interleaver 168 or the modulation mappers 169.

2. Multi-Carrier Aggregation Environment

Communication environments considered in embodiments of the present invention include a multi-carrier environment. That is, a multi-carrier system or a multi-carrier aggregation system refers to a system that aggregates one or more Component Carriers (CCs) each having a smaller bandwidth than a target bandwidth in order to support a broad band in the present invention.

In the present invention, multi-carrier means carrier aggregation (or carrier combining). Carrier aggregation covers aggregation of non-contiguous carriers as well as aggregation of contiguous carriers. The term carrier aggregation is interchangeably used with carrier combining, bandwidth combining, etc.

The LTE-A system aims to support a bandwidth of up to 100 MHz by use of multi-carriers (i.e. CA) configured by aggregating two or more CCs. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A multi-carrier system of the present invention may support carrier combining (i.e. CA) by defining a new bandwidth irrespective of the bandwidths used in the legacy system.

The LTE-A system adopts the concept of cell to manage radio resources. A cell is defined by combining DL and UL resources, although the UL resources are not a necessity. Accordingly, a cell may be configured with DL resources alone or both DL and UL resources. If multiple carriers (i.e. carrier combining or CA) are supported, the linkage between the carrier frequencies of DL resources (or DL CCs) and the carrier frequencies of UL resources (or UL CCs) may be indicated by a System Information Block (SIB).

In the LTE-A system, a Primacy Cell (PCell) and a Secondary Cell (SCell) are defined. A PCell refers to a cell operating in a primary frequency (e.g. a Primary CC (PCC)) and a SCell refers to a cell operating in a secondary frequency (a Secondary CC (SCC)). Only one PCell and one or more SCells may be allocated to a specific UE.

The UE uses the PCell for initial connection establishment or connection reestablishment. The PCell may be a cell indicated during handover. A SCell may be configured after RRC connection establishment and may be used to provide additional radio resources.

A PCell and a SCell may be used as serving cells. If the UE is in RRC_CONNECTED state but CA has not been configured or is not supported in the UE, only one serving cell being a PCell exists for the UE. On the other hand, if the UE is in RRC_CONNECTED state and CA has been configured for the UE, one or more serving cells may exist for the UE. The total serving cells include a PCell and one or more SCells.

After an initial security activation procedure starts, an E-UTRAN may configure a network including one or more SCells by adding them to a PCell initially configured during connection establishment. In a multi-carrier environment, each of a PCell and a SCell may operate as a CC. That is, CA may be regarded as combining a PCell with one or more SCells. Hereinbelow, a PCC may be used interchangeably with a PCell in the same meaning and an SCC may be used interchangeably with an SCell in the same meaning.

3. Method for Transmitting UCI

Embodiments of the present invention relate to a resource allocation method, a channel coding method, a transmission structure, and joint/separate coding methods regarding UCI and precoding indexes $W_1$ and $W_2$, in the case where UCI is piggybacked to data on a PUSCH in a CA environment. Embodiments of the present invention may also apply to a MIMO system and a single antenna transmission environment.

Figure 18:
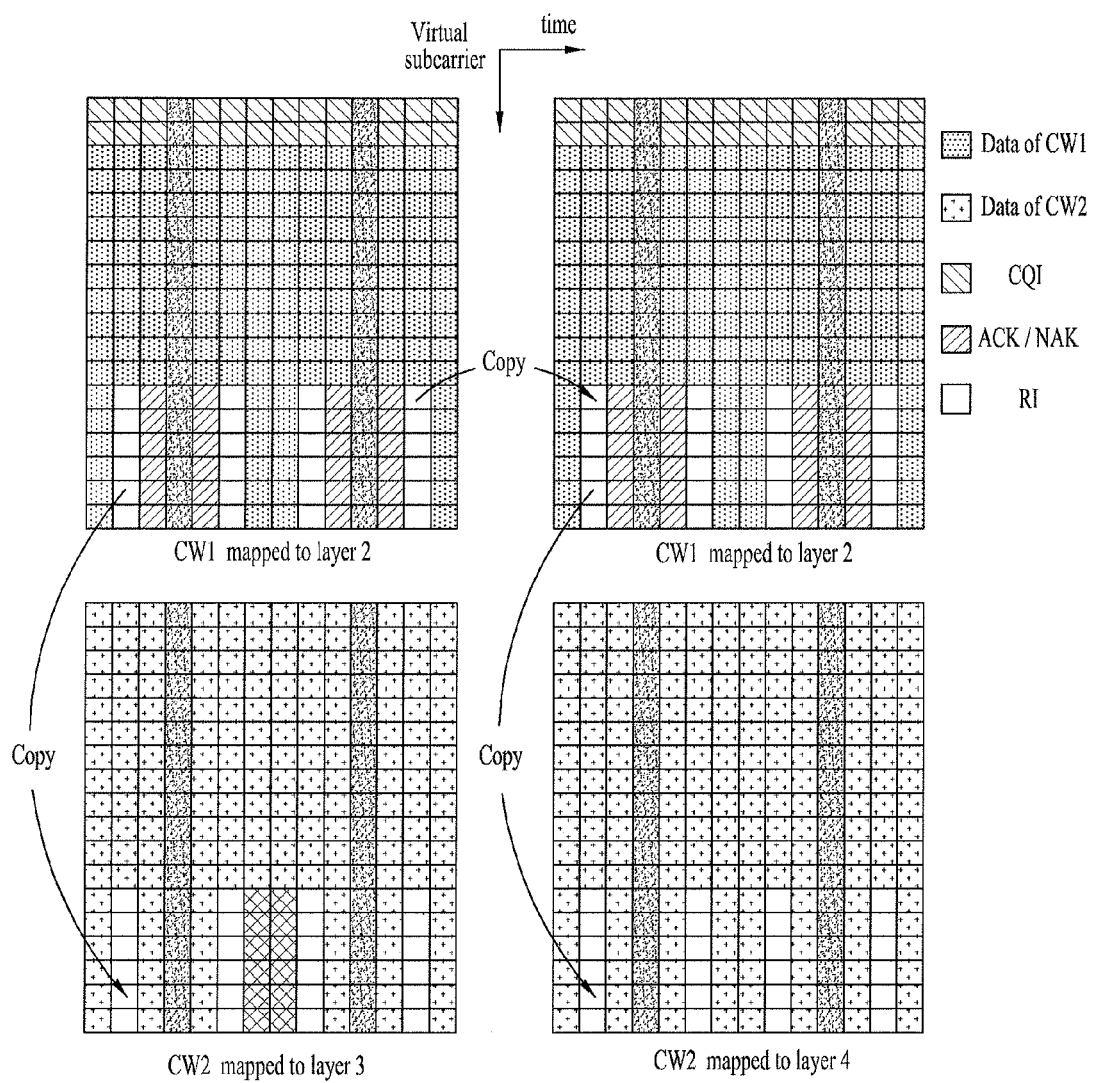
FIG. 18 illustrates one of methods for mapping uplink data and UCI to physical resource elements, for transmission.

3.1 UCI Allocation Positions on PUSCH FIG. 18 illustrates one of methods for mapping UL data and UCI to physical REs, for transmission.

In FIG. 18, UCI is transmitted in 2 codewords and 4 layers. A CQI is combined with data and mapped, in a time-first mapping scheme, to the remaining REs except REs to which an RI is mapped, using the same modulation order as used for the data and all constellation points. In Single User MIMO (SU-MIMO), the CQI is spread to one codeword and then transmitted. For example, the CQI is transmitted in a codeword having the higher MCS level between two codewords. If the two codewords have the same MCS level, the CQI is transmitted in codeword 0.

An ACK/NACK, is allocated to symbols at both sides of RSs by puncturing the combined CQI and data. Since RSs are located in symbol 3 and symbol 10, the ACK/NACK is mapped upward starting from the lowest subcarrier in symbols 2, 4, 9, and 11. The ACK/NACK is mapped in the order of symbols 2, 11, 9 and 4.

An RI is mapped to symbols adjacent to the ACK/NACK. The RI is mapped first of all information transmitted on the PUSCH (the data, the CQI, the ACK/NACK, and the RI). Specifically, the RI is mapped upward starting from the lowest subcarrier in symbols 1, 5, 8, and 12. The RI is mapped in the order of symbols 1, 12, 8 and 5.

Particularly, if each of the ACK/NACK and the RI has 1-bit or 2-bit information, they are mapped in QPSK, using four corners of the constellation. If each of the ACK/NACK and the RI has 3 or more information bits, they may be mapped using all constellation points of the same modulation order as that of the data. In addition, each of the ACK/NACK and the RI carries the same information in the same resources at the same positions in all layers.

3.2 Calculation of Number of Coded Modulation Symbols for CQI and/or PMI

In embodiments of the present invention, the number of modulation symbols may be equivalent to the number of code symbols or the number of REs.

Control information or control data is input in the form of channel quality information (a CQI and/or a PMI), an HARQ-ACK, and an RI to channel encoders (e.g. S1350, S1360, and S1370 in FIG. 13 or 165 in FIG. 16). Since a different number of code symbols are allocated to control information, a different coding rate is applied to the control information. If UCI is transmitted on a PUSCH, control information bits $o_0, o_1, o_2, \ldots, o_{o-1}$ of UL Channel State Information (CSI), that is, each of an HARQ-ACK, an RI, and a CQI (or PMI) are channel-encoded independently.

When a UE transmits channel quality control information bits (i.e. a CQI or PMI) on a PUSCH, the number of REs per layer for the CQI or PMI may be calculated by [Equation 1].

$$Q' = \min\left(\left\lceil \frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}} \right\rceil, M_{sc}^{PUSCH} \cdot N_{symb}^{PUSCH} - \frac{Q_{RI}}{Q_m}\right)$$ [Equation 1]

In [Equation 1], the number of REs for the CQI or PMI may be expressed as the number Q' of coded modulation symbols. While the following description focuses on the CQI, the same thing applies to the PMI.

In [Equation 1], O is the number of CQI bits and L is the number of CRC bits added to the CQI bits. If O is 11 or fewer bits, L is 0 and otherwise, L is 8. That is, $$L = \begin{cases} 0 & O \le 11 \\ 8 & \text{otherwise.} \end{cases}$$

A beta offset $\beta_{offset}^{CQI}$ is determined according to the number of transmission codewords for TBs. A parameter for determining an offset value in consideration of the Signal to Noise Ratio (SNR) difference between data and UCI are determined to be $\beta_{offset}^{PUSCH} = \beta_{offset}^{CQI}$.

$M_{sc}^{PUSCH}$ is a bandwidth allocated (scheduled) for PUSCH transmission in a current subframe for a TB, expressed as the number of subcarriers. $N_{symb}^{PUSCH}$ is the number of SC-FDMA symbols in the current subframe carrying the PUSCH.

$N_{symb}^{PUSCH-initial}$ is the number of SC-FDMA symbols per initial PUSCH transmission subframe for the same TB, $M_{sc}^{PUSCH-initial}$ is the number of subcarriers in the corresponding subframe, and x of $K_r^{(x)}$ is the index of a TB having the highest MCS indicated by a UL grant.

$M_{sc}^{PUSCH-initial}$, C and $K_r^{(x)}$ may be acquired from an initial PDCCH for the same TB. If the initial PDCCH (DCI format 0) does not include $M_{sc}^{PUSCH-initial}$, C and $K_r^{(x)}$, the UE may determine the values in a different manner.

For example, when an initial PUSCH for the same TB as transmitted at an initial transmission is scheduled semi-persistently, $M_{sc}^{PUSCH-initial}$, C and $K_r^{(x)}$ may be determined from the latest semi-persistently scheduled PDCCH. Or $M_{sc}^{PUSCH-initial}$, C and $K_r^{(x)}$ may be determined from a random access response grant for the same TB, when the initial PUSCH is indicated by the random access response grant.

The number G of data information bits of the UL-SCH may be calculated by the following equation.

$$G = N_{symb}^{PUSCH} \cdot M_{sc}^{PUSCH} \cdot Q_m - Q_{CQI} - Q_{RI}$$ [Equation 2]

Once the number of REs for the CQI is determined in the above-described manner, the number of channel-coded bits of the CQI may be calculated in consideration of a modulation scheme. $Q_{CQI}$ is the total number of CQI coded bits and $Q_{CQI} = Q_m \cdot Q'$ where $Q_m$ is the number of bits per symbol according to a modulation order, 2 in QPSK, 4 in 16QAM, and 6 in 64QAM. Since RI resources are first allocated, the number of REs allocated to the RI is excluded. If the RI is not transmitted, $Q_{RI} = 0$.

3.3 Calculation of Number of Coded Modulation Symbols for HARQ-ACK or RI

Now, a description will be given of methods for calculating the numbers of REs for an ACK/NACK and an RI.

When a UE transmits HARQ-ACK bits or RI bits, the UE should determine the number Q' of coded modulation symbols per layer for the HARQ-ACK or the RI. [Equation 3] is used to calculate the numbers of coded modulation symbols (i.e. the numbers of REs) carrying the ACK/NACK and the RI.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right)$$ [Equation 3]

In [Equation 3], the number of REs for the ACK/NACK (or the RI) may be expressed as the number Q' of coded modulation symbols. Herein, O is the number of ACK/NACK (or RI) bits.

$\beta_{offset}^{HARQ-ACK}$ and $\beta_{offset}^{RI}$ are determined according to the number of transmission codewords based on TBs. Parameters for setting offset values in consideration of the SNR difference between data and UCI are determined to be $\beta_{offset}^{PUSCH} = \beta_{offset}^{HARQ-ACK}$ and $\beta_{offset}^{PUSCH} = \beta_{offset}^{RI}$.

$M_{sc}^{PUSCH1}$ is a bandwidth allocated (scheduled) for PUSCH transmission in a current subframe for a TB, expressed as the number of subcarriers. $N_{symb}^{PUSCH-initial}$ is the number of SC-FDMA symbols per initial PUSCH transmission subframe for the same TB and $M_{sc}^{PUSCH-initial}$ is the number of subcarriers per subframe for initial PUSCH transmission.

The number $M_{sc}^{PUSCH-initial}$ of subcarriers for an initial transmission TB, the total number C of CBs derived from a TB, and the size $K_r^{(x)}$, x={0,1} of each CB may be acquired from an initial PDCCH for the same TB.

If these values are not included in the initial PDCCH (DCI format 0 or 4), they may be determined in a different manner. For example, when an initial PUSCH for the same TB is semi-persistently scheduled, $M_{sc}^{PUSCH-initial}$, C, and $K_r^{(x)}$, x={0,1} may be determined from the latest semi-persistently scheduled PDCCH. Or these values may be determined from a random access response grant for the same TB, when the initial PUSCH is indicated by the random access response grant.

When the UE is to transmit two TBs in a UL cell, the UE should determine the number Q' of coded modulation symbols per layer for the HARQ-ACK or the RI. When the initial transmission resource values of the two TBs are different in the UL cell, the number of modulation symbols is calculated by [Equation 4] and [Equation 5].

$$Q' = \max[\min(Q'_{temp}, 4 \cdot M_{sc}^{PUSCH}), Q'_{min}] \quad \text{[Equation 4]}$$

$$Q'_{temp} = \begin{bmatrix} O \cdot M_{sc}^{PUSCH-initial(1)} \cdot N_{symb}^{PUSCH-initial(1)} \cdot \\ \dfrac{M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} +} \\ \sum_{r=0}^{C^{(2)}-1} K_r^{(2)} \cdot M_{sc}^{PUSCH-initial(1)} \cdot N_{symb}^{PUSCH-initial(1)} \end{bmatrix} \quad \text{[Equation 5]}$$

In [Equation 4] and [Equation 5], the number of REs for the ACK/NACK (or the RI) may be expressed as the number Q' of coded modulation symbols. O is the number of ACK/NACK (or RI) bits. If $O \leq 2$ and $Q'_{min} = \lceil 2O/Q' \rceil$, $Q'_{min} = O$ and otherwise, $Q'_m = \min(Q_m^1, Q_m^2)$. $Q_m^x$, $x=\{1,2\}$ indicating the modulation order of a TB 'x' and $M_{sc}^{PUSCH-initial(x)}$, $x=\{1,2\}$ indicating a scheduled bandwidth expressed as the number of subcarriers for PUSCH transmission in an initial subframe for a first TB and a second TB.

In addition, $N_{symb}^{PUSCH-initial(x)}$, $x=\{1,2\}$ is the number of SC-FDMA symbols per subframe for initial PUSCH transmission of the first and second TBs. $N_{symb}^{PUSCH-initial(x)}$ may be calculated by [Equation 6].

$$N_{symb}^{PUSCH-initial(x)} = (2 \cdot (N_{symb}^{UL} - 1) - N_{SRS}^{(x)}), x=\{1,2\} \quad \text{[Equation 6]}$$

If the UE transmits a PUSCH and an SRS in the same subframe for initial transmission of TB 'x' or PUSCH resource allocation for initial transmission of TB 'x' is partially overlapped with a cell-specific RSR subframe and bandwidth configuration, $N_{SRS}^{(x)}$, $x=\{1,2\}$ is 1 and otherwise, $N_{SRS}^{(x)}$, $x=\{1,2\}$ is 0.

In embodiments of the present invention, the UE may acquire $M_{sc}^{PUSCH-initial(x)}$, $x=\{1,2\}$, C, and $K_r^{(x)}$, $x=\{1,2\}$ from an initial PDCCH for a corresponding TB. If the initial PDCCH (DCI format 0 or 4) does not include these values, the values may be determined in a different manner. For example, when an initial PUSCH for the same TB is semi-persistently scheduled, $M_{sc}^{PUSCH-initial(x)}$, $x=\{1,2\}$, C, and $K_r^{(x)}$, $x=\{1,2\}$ may be determined from the latest semi-persistently scheduled PDCCH. Or these values may be determined from a random access response grant for the same TB, when the initial PUSCH is indicated by the random access response grant.

In [Equation 4] and [Equation 5], $\beta_{offset}^{HARQ-ACK}$ and $\beta_{offset}^{RI}$ are determined according to the number of transmission codewords based on TBs. Parameters for setting offset values in consideration of the SNR difference between data and UCI are determined to be $\beta_{offset}^{PUSCH} = \beta_{offset}^{HARQ-ACK}$ and $\beta_{offset}^{PUSCH} = \beta_{offset}^{RI}$.

3.4 Channel Coding

A method for channel-encoding UCI according to the number of REs for each UCI value calculated in the above-described methods will be described below.

If an ACK/NACK has one information bit, its input sequence may be represented as $[o_0^{ACK}]$ and channel-encoded according to a modulation order as illustrated in [Table 1]. $Q_m$ is the number of bits per symbol for each modulation order, which is 2, 4 and 6 respectively in QPSK, 16QAM, and 64QAM.

TABLE 1

| $Q_m$ | Encoded HARQ-ACK |
|---|---|
| 2 | $[o_0^{ACK} y]$ |
| 4 | $[o_0^{ACK} y \, x \, x]$ |
| 6 | $[o_0^{ACK} y \, x \, x \, x \, x]$ |

If the ACK/NACK has two information bits, its input sequence may be represented as $[o_0^{ACK} \, o_1^{ACK}]$ and channel-encoded according to a modulation order as illustrated in [Table 2]. $o_0^{ACK}$ is an ACK/NACK bit for codeword 0, $o_1^{ACK}$ is an ACK/NACK bit for codeword 1, and $o_2^{ACK} = (o_0^{ACK} + o_1^{ACK}) \bmod 2$. In [Table 1] and [Table 2], x and y are placeholders for scrambling ACK/NACK information so as to maximize the Euclidean distance between modulation symbols carrying the ACK/NACK information.

TABLE 2

| $Q_m$ | Encoded HARQ-ACK |
|---|---|
| 2 | $[o_0^{ACK} o_1^{ACK} o_2^{ACK} o_0^{ACK} o_1^{ACK} o_2^{ACK}]$ |
| 4 | $[o_0^{ACK} o_1^{ACK} x \, x \, o_2^{ACK} o_0^{ACK} x \, x \, o_1^{ACK} o_2^{ACK} x \, x]$ |
| 6 | $[o_0^{ACK} o_1^{ACK} x \, x \, x \, x \, o_2^{ACK} o_0^{ACK} x \, x \, x \, x \, o_1^{ACK} o_2^{ACK} x \, x \, x \, x]$ |

In multiplexing an ACK/NACK in Frequency Division Duplexing (FDD) or Time Division Duplexing (TDD), if the ACK/NACK is one or two bits, a bit sequence $q_0^{ACK}, q_1^{ACK}, q_2^{ACK}, \ldots, q_{Q_{ACK}-1}^{ACK}$ is generated by concatenating multiple ACK/NACK CBs. In ACK/NACK bundling in TDD, a bit sequence $\tilde{q}_0^{ACK}, \tilde{q}_1^{ACK}, \tilde{q}_2^{ACK}, \ldots, \tilde{q}_{Q_{ACK}-1}^{ACK}$ is also generated by concatenating multiple coded ACK/NACK CBs. $Q_{ACK}$ is the total number of coded bits of all coded ACK/NACK CBs. The last concatenated ACK/NACK CB may be configured partially such that the total length of the bit sequence is equal to $Q_{ACK}$.

A scrambling sequence $[w_0^{ACK} w_1^{ACK} w_2^{ACK} w_3^{ACK}]$ may be selected from the following [Table 3] and the index i of the scrambling sequence may be determined by [Equation 7].

$$i = (N_{bundled} - 1) \bmod 4 \quad \text{[Equation 7]}$$

TABLE 3

| i | $[w_0^{ACK} w_1^{ACK} w_2^{ACK} w_3^{ACK}]$ |
|---|---|
| 0 | [1 1 1 1] |
| 1 | [1 0 1 0] |
| 2 | [1 1 0 0] |
| 3 | [1 0 0 1] |

[Table 3] is a scrambling sequence selection table for TDD ACK/NACK bundling.

If the ACK/NACK is one bit, m=1 and if the ACK/NACK is two bits, m=3, to thereby generate the bit sequence $q_0^{ACK}, q_1^{ACK}, q_2^{ACK}, \ldots, q_{Q_{ACK}-1}^{ACK}$. The bit sequence $q_0^{ACK}, q_1^{ACK}, q_2^{ACK}, \ldots, q_{Q_{ACK}-1}^{ACK}$ is generated by the algorithm expressed as [Table 4].

TABLE 4

```
Set i ,k to 0
while i < Q_ACK
    if q̃_i^ACK = y // place-holder repetition bit
        q_i^ACK = (q̃_{i-1}^ACK + w_{⌊k/m⌋}^ACK)mod2
        k = (k + 1)mod 4m
    else
        if q̃_i^ACK = x // a place-holder bit
            q_i^ACK = q̃_i^ACK
        else // coded bit
            q_i^ACK = (q̃_i^ACK + w_{⌊k/m⌋}^ACK)mod2
            k = (k + 1)mod 4m
        end if
        i = i + 1
end while
```

If the HARQ-ACK has more than 2 information bits (i.e. $[o_0^{ACK}, o_1^{ACK} \ldots o_{O^{ACK}-1}^{ACK}]$ and $O^{ACK} > 2$), the bit sequence may be obtained by [Equation 8].

$$q_i^{ACK} = \sum_{n=0}^{O^{ACK}-1} (O_n^{ACK} \cdot M_{(i\,mod\,32),n}) mod 2 \qquad [\text{Equation 8}]$$

In [Equation 8], i=0, 1, 2, ..., $Q_{ACK}$−1 and a base sequence $M_{i,n}$ may be given as [Table 5].

TABLE 5

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

When HARQ-ACK/RI information having two or more bits is transmitted on a PUSCH, the HARQ-ACK/RI information may be encoded with an RM code illustrated in [Table 5]. A channel-coded vector sequence output of the HARQ-ACK information may be represented as $q_0^{ACK}$, $q_1^{ACK}$, ..., $q_{Q'_{ACK}-1}^{ACK}$ where $Q'_{ACK} = Q_{ACK}/Q_m$.

The bit sequence $q_0^{ACK}, q_1^{ACK}, \ldots, q_{Q'_{ACK}-1}^{ACK}$ is generated by the algorithm of [Table 6].

TABLE 6

```
Set i,k to 0
while i < Q_ACK
    q_k^ACK = [q_i^ACK ... q_{i+Q_m-1}^ACK]^T
    i = i + Q_m
    k = k + 1
end while
```

If the RI has one information bit, its input sequence may be represented as $[o_0^{RI}]$ and channel-encoded according to a modulation order as illustrated in [Table 7].

TABLE 7

| $Q_m$ | Encoded RI |
|---|---|
| 2 | $[o_0^{RI}\,y]$ |
| 4 | $[o_0^{RI}\,y\,x\,x]$ |
| 6 | $[o_0^{RI}\,y\,x\,x\,x\,x]$ |

$Q_m$ is the number of bits per symbol for a modulation order, which is 2, 4 and 6, respectively in QPSK, 16QAM, and 64QAM. An RI is mapped to $[o_0^{RI}]$ as illustrated in [Table 8].

TABLE 8

| $o_0^{RI}$ | RI |
|---|---|
| 0 | 1 |
| 1 | 2 |

If the RI has two information bits, its input sequence may be represented as $[o_0^{RI} \, o_1^{RI}]$ and channel-encoded according to a modulation order as illustrated in [Table 9]. $o_0^{RI}$ is the Most Significant Bit (MSB) of the 2-bit input, and $o_1^{RI}$ is the Least Significant Bit (LSB) of the 2-bit input. $o_2^{RI} = (o_0^{RI} + o_1^{RI}) \bmod 2$.

TABLE 9

| $Q_m$ | Encoded RI |
|---|---|
| 2 | $[o_0^{RI} \, o_1^{RI} \, o_2^{RI} \, o_0^{RI} \, o_1^{RI} \, o_2^{RI}]$ |
| 4 | $[o_0^{RI} \, o_1^{RI} \, x \, x \, o_2^{RI} \, o_0^{RI} \, x \, x \, o_1^{RI} \, o_2^{RI} \, x \, x]$ |
| 6 | $[o_0^{RI} \, o_1^{RI} \, x \, x \, x \, x \, o_2^{RI} \, o_0^{RI} \, x \, x \, x \, x \, o_1^{RI} \, o_2^{RI} \, x \, x \, x \, x]$ |

[Table 10] below illustrates an exemplary mapping relationship between $[o_0^{RI} \, o_1^{RI}]$ and the RI.

TABLE 10

| $o_0^{RI}$ | RI |
|---|---|
| 0 | 1 |
| 1 | 2 |

In [Table 7] and [Table 9], x and y are placeholders for scrambling RI information so as to maximize the Euclidean distance between modulation symbols carrying the RI information.

A bit sequence $q_0^{RI}, q_1^{RI}, q_2^{RI}, \ldots, q_{Q_{RI}-1}$ is generated by concatenating multiple coded RI CBs. $Q_{RI}$ is the total number of coded bits of all RI CBs. The last concatenated coded RI CB may be configured partially such that the total length of the bit sequence is equal to $Q_{RI}$.

A channel-coded vector output sequence of the RI is represented as $\underline{q}_0^{RI}, \underline{q}_1^{RI}, \ldots, \underline{q}_{Q'_{RI}-1}$ where $Q'_{RI} = Q_{RI}/Q_m$. The vector output sequence may be obtained by the algorithm of [Table 11].

TABLE 11

Set i,k to 0
while i < $Q_{RI}$
$\underline{q}_k^{RI} = [q_i^{RI} \ldots q_{i+Q_m-1}^{RI}]^T$
i = i + $Q_m$
k = k + 1
end while If the RI (or the ACK/NACK) has 3 to 11 information bits, the RI is channel-encoded to a 32-bit output sequence by the afore-described RM coding. The RM-coded RI (or ACK/NACK) block $b_0, b_1, b_2, b_3, \ldots, b_{B-1}$ is calculated by [Equation 9], where i=0, 1, 2, . . . , B−1 and B=32.

$$b_i = \sum_{n=0}^{O-1} (O_n \cdot M_{i,n}) \bmod 2 \quad \text{[Equation 9]}$$

In [Equation 14], i=0, 1, 2, . . . , $Q_{RI}$−1 and a base sequence $M_{i,r}$ may be given as illustrated in [Table 5]. That is, the RI information bits may be encoded with an RM code illustrated in [Table 5] and transmitted on a PUSCH.

3.5 Rate Matching

To map the UCI encoded to B bits by [Equation 9] to Q' REs, the coded UCI may be rate-matched by [Equation 10].

$$q_i = b_{i \bmod B}, i=0,1,\ldots,Q_m \times Q'-1 \quad \text{[Equation 10]}$$

In [Equation 10], $Q_m$ is the number of bits per modulation symbol, 2, 4 and 6 respectively in QPSK, 16QAM, and 64QAM. The channel coding procedure of Clause 3.4 may be used for or may be replaced with channel coding of UCI (a CQI, a HARQ-ACK, and an RI) in FIG. 13 (e.g. steps S1350, S1360, and S1370). The following channel coding procedures according to embodiments of the present invention may be applied to or replaced with the channel coding of FIG. 13.

4. Methods for Calculating Number of REs for UCI Having Large Payload Size

Methods for calculating the number of REs for UCI having a large payload size by applying the methods for calculating the number of REs for UCI, described in Clause 3 to the CA environment described in Clause 2 will be described below. That is, a description will be given of methods for calculating the numbers of REs allocated to a CQI, an RI, and an ACK/NACK, when UCI is multiplexed with data into a PUSCH in a CA environment. In the following description, the number of REs may mean the number of modulation symbols or the number of code symbols.

The following [Equation 11] describes one of methods for determining the number of REs for a CQI and/or a PMI.

$$Q'_{CQI} = \frac{(O+L) \cdot \left( M_{sc}^{PUSCH\_initial} \cdot N_{Symb}^{PUSCH\_initial} - \dfrac{Q'_{CQI} - Q'_{RI}}{\sum_{r=0}^{C-1} K_r} \right) \cdot \beta_{offset}^{CQI}}{\sum_{r=0}^{C-1} K_r} \quad \text{[Equation 11]}$$

$$= \frac{(O+L) \cdot \left( M_{sc}^{PUSCH\_initial} \cdot N_{Symb}^{PUSCH\_initial} - \dfrac{}{Q'_{RI}} \right) \cdot \beta_{offset}^{CQI}}{\sum_{r=0}^{C-1} K_r + (O+L) \cdot \beta_{offset}^{CQI}}$$

The number of REs for the CQI and/or the RI is $Q'_{CQI}$. The other parameters in [Equation 11] may use the values of the parameters described in [Equation 1] to [Equation 10]. Accordingly, a detailed description of the parameters used in [Equation 11] is pursuant to the description of [Equation 1] to [Equation 10].

The following [Equation 12] describes one of methods for determining the number of REs for an RI.

$$Q'_{RI} = \frac{O^{RI} \cdot \left( M_{sc}^{PUSCH\_initial} \cdot N_{symb}^{PUSCH\_initial} - \dfrac{(Q'_{CQI} - Q'_{RI}) \cdot \beta_{offset}^{RI}}{\sum_{r=0}^{C^{(1)}-1} K_r^{(1)} + \sum_{r=0}^{C^{(2)}-1} K_r^{(2)}} \right)}{\sum_{r=0}^{C^{(1)}-1} K_r^{(1)} + \sum_{r=0}^{C^{(2)}-1} K_r^{(2)}} \quad \text{[Equation 12]}$$

$$= \frac{O^{RI} \cdot \beta_{offset}^{RI} \cdot M_{sc}^{PUSCH\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} + \dfrac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L) \beta_{offset}^{CQI} + O^{RI} \cdot \beta_{offset}^{RI}}$$

In [Equation 12], the number of REs for the RI is $Q'_{RI}$. $O^{RI}$ is the number of bits of the RI. If two CBs are used, $K_r^{(1)}$ and $K_r^{(2)}$ are the sizes of the two CBs, respectively. $K_r^{(CQI)}$ represents the size of a CB carrying a CQI.

The following [Equation 13] describes one of methods for determining the number of REs for an ACK/NACK.

$$Q'_{ACK} = \frac{O^{ACK} \cdot \beta_{offset}^{ACK} \cdot M_{sc}^{PUSCH\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} +} $$

$$\frac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L)\beta_{offset}^{CQI} + O^{RI} \cdot \beta_{offset}^{RI} +$$

$$O^{ACK} \cdot \beta_{offset}^{ACK}$$

[Equation 13]

In [Equation 13], the number of REs for the ACK/NACK is $Q'^{ACK}$. $O^{ACK}$ is the number of bits of the ACK/NACK and $O^{RI}$ is the number of bits of the RI. If two CBs are used, $K_r^{(1)}$ and $K_r^{(2)}$ are the sizes of the two CBs, respectively. $K_r^{(CQI)}$ represents the size of a CB carrying the CQI.

Parameters in [Equation 11], [Equation 12], and [Equation 13], which are not described herein are identical to their counterparts described in [Equation 1] to [Equation 10]. Accordingly, for a description of the parameters, the description of [Equation 1] to [Equation 10] is referred to.

5. Method for Multiplexing UCI into PUSCH

Figure 19:
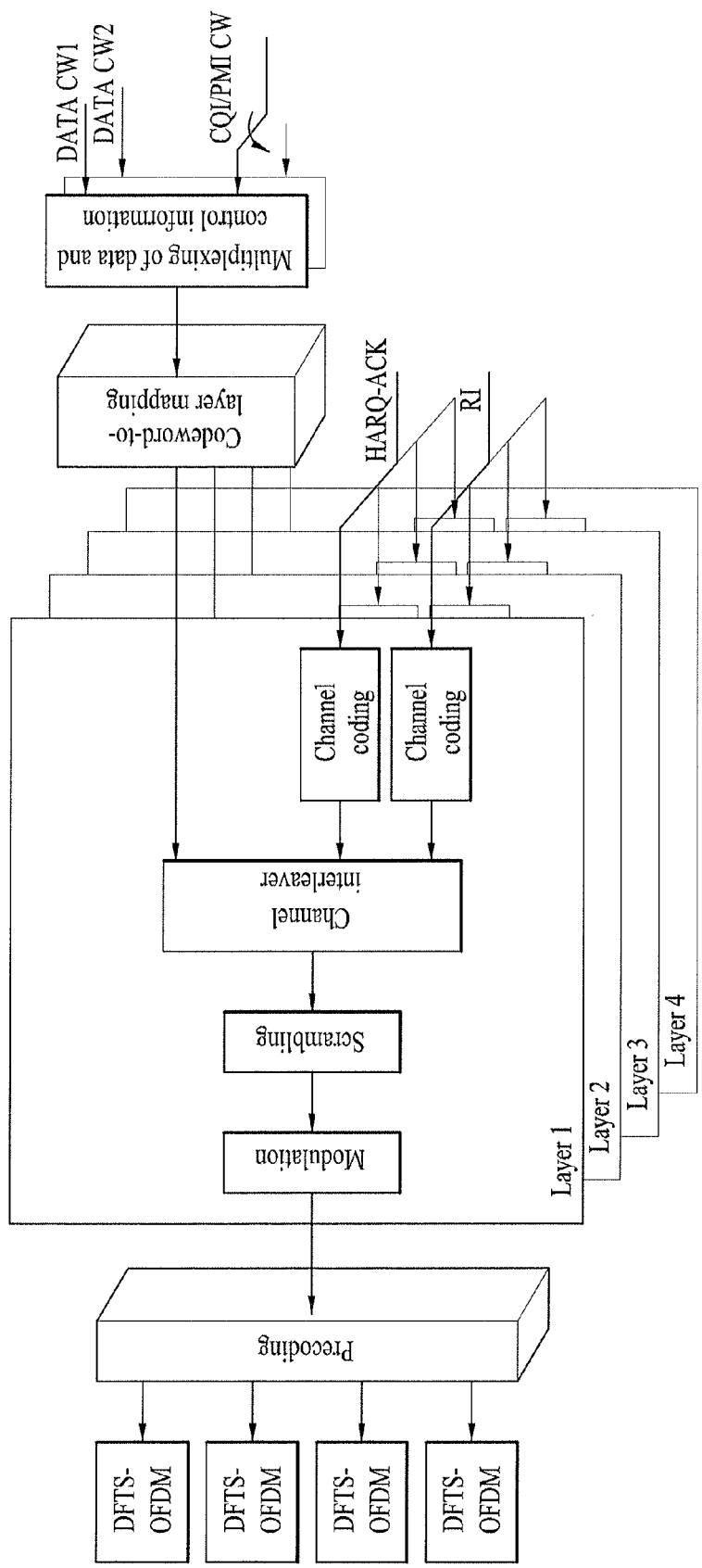
FIG. 19 illustrates a method for multiplexing UCI with a PUSCH according to an embodiment of the present invention.

FIG. 19 illustrates a method for multiplexing UCI into a PUSCH according to an embodiment of the present invention.

If UCI is piggybacked to or multiplexed into a PUSCH as descried before in Clause 1 to Clause 4, codeword-to-layer mapping may be performed at a bit level or a vector sequence level. An operation for multiplexing UCI into a PUSCH is illustrated in FIG. 19.

Referring to FIG. 19, if a codeword-to-layer mapping module resides before a channel interleaver, data and UCI input to the codeword-to-layer mapping module are bit streams that are not modulated yet. That is, since the data and the UCI are bit streams, codeword to layer mapping may be performed at a bit level or a vector sequence level. Conventionally, codeword-to-layer mapping is performed after channel interleaving and thus data and UCI are input in symbols to the codeword-to-layer mapping module.

5.1. If the codeword-to-layer mapping module performs codeword-to-layer mapping at a bit level or a vector sequence level, it may follow a PDSCH codeword-to-layer mapping rule illustrated in [Table 12] at a bit level or a vector sequence level.

5.2. If the codeword-to-layer mapping scheme of [Table 12] applies to a PUSCH, i may be applied on a bit basis.

Referring to FIG. 19, for example, bits may be mapped sequentially to layers belonging to a codeword, one by one. In this case, $M_{Symb}^{layer}$ may be larger than a value allocated in [Table 12] by $Q_m \times N_{Symb}^{PUSCH}$ times. $Q_m$ is the number of bits per modulation symbol according to a modulation order, 2 in QPSK, 4 in 16QAM, and 6 in 64QAM. $N_{Symb}^{PUSCH}$ is the number of columns in the channel interleaver.

5.3. If the codeword-to-layer mapping scheme of [Table 12] applies to a PUSCH, i may be applied on the basis of a vector sequence allocated to one modulation symbol.

That is, $Q_m$-bit vector sequences may be mapped sequentially to layers belonging to a codeword, one by one. $Q_m$ is the number of bits per modulation symbol according to a modulation order, 2 in QPSK, 4 in 16QAM, and 6 in 64QAM. In this case, $M_{Symb}^{layer}$ may be larger than a value allocated in [Table 12] by $N_{Symb}^{PUSCH}$ times. $N_{Symb}^{PUSCH}$ is the number of columns in the channel interleaver.

5.4. If the codeword-to-layer mapping scheme of [Table 12] applies to a PUSCH, i may be a bit stream having as many bits as modulation symbols allocated to one row in the channel interleaver. That is, if the channel interleaver has $N_{Symb}^{PUSCH}$ columns, $Q_m \times N_{Symb}^{PUSCH}$-bit vector bit streams may be mapped sequentially to layers belonging to a codeword, one by one. In this case, $M_{Symb}^{layer}$ may be equal to a value allocated in [Table 12].

5.5. If the codeword-to-layer mapping scheme of [Table 12] applies to a PUSCH, i may be a bit stream having as many bits as the number of columns in the channel interleaver. That is, if the channel interleaver has $N_{Symb}^{PUSCH}$ columns, $N_{Symb}^{PUSCH}$-bit vector bit streams may be mapped sequentially to layers belonging to a codeword, one by one. In this case, $M_{Symb}^{layer}$ may be larger than a value allocated in [Table 12] $Q_m$ by times. $Q_m$ is the number of bits per modulation symbol according to a modulation order, 2 in QPSK, 4 in 16QAM, and 6 in 64QAM.

5.6. Codeword-to-layer mapping may be performed by sequentially allocating bits to layers belonging to a codeword, one by one.

5.7. Codeword-to-layer mapping may be performed by sequentially allocating vector sequences each having as many bits as required for a modulation symbol to layers belonging to a codeword, one by one. That is, $Q_m$ bits may be allocated to each layer at one time.

5.8. Codeword-to-layer mapping may be performed by allocating the former half of a data stream obtained by concatenating data to a CQI to layer 0 and allocating the latter

TABLE 12

| Number of layers | Number of codewords | codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ | half of the stream to layer 1. In this case, if one layer belongs to a codeword, an entire data stream may be allocated to the single layer.

6. Apparatuses

Apparatuses illustrated in FIG. 20 are means that can implement the methods described before with reference to FIGS. 1 to 19.

A UE may act as a transmitter on UL and as a receiver on DL. An eNB may act as a receiver on UL and as a transmitter on DL.

That is, each of the UE and the eNB may include a Transmission (Tx) module 2040 or 2050 and a Reception (Rx) module 2060 or 2070, for controlling transmission and reception of information, data, and/or messages, and an antenna 2000 or 2010 for transmitting and receiving information, data, and/or messages.

Each of the UE and the eNB may further include a processor 2020 or 2030 for implementing the afore-described embodiments of the present invention and a memory 2080 or 2090 for temporarily or permanently storing operations of the processor 2020 or 2030.

The embodiments of the present invention may be performed using the components and functions of the UE and the eNB. The apparatuses illustrated in FIG. 20 may further include the configurations of FIGS. 2, 3 and 4. The processors may include the configurations of FIGS. 2, 3 and 4.

The processor of the UE may receive a PDCCH signal by monitoring a search space. Particularly, an LTE-A UE may receive a PDCCH without blocking from another LTE UE by blind-decoding an extended Common Search Space (CSS).

Particularly, the processor 2020 of the UE may transmit UCI along with a PUSCH signal to the eNB. That is, the processor of the UE may calculate the numbers of REs for an HARQ-ACK, a CQI, and an RI in the methods expressed as [Equation 1] to [Equation 6]. Therefore, the UE may generate UCI having a large payload size based on the calculated numbers of REs, piggyback UL-SCH data with the UCI, and transmit the UL-SCH to the eNB.

The UE and/or the eNB may generate and transmit UCI having large payload according to the methods described before in Clauses 3, 4, and 5. Then, the UE may multiplex the UCI into a PUSCH by codeword-to-layer mapping and then transmit the multiplexed signal to the eNB.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 20 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.)

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2080 or 2090 and executed by the processor 2020 or 2030. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for transmitting Uplink Control Information (UCI) having a large payload size in a wireless access system, the method comprising:
   obtaining a number of first Resource Elements (REs) allocated to a Channel Quality Indicator (CQI) information to be included in the UCI;
   obtaining a number of second REs allocated to a Rank Indicator (RI) information to be included in the UCI;
   obtaining a coding rate of data transmitted along with the UCI according to the number of the first REs and the number of the second REs;
   obtaining a number of third REs allocated to the UCI based on the coding rate of the data; and
   transmitting the UCI to a Base Station (BS) by multiplexing the UCI into a Physical Uplink Shared CHannel (PUSCH) based on the number of the third REs,
   wherein when the coding rate of the data is obtained, a number of fourth REs allocated to an ACKnowledgement/Negative ACKnowledgement (ACK/NACK) information to be included in the UCI is not considered, and wherein the number of the first REs is calculated by:

$$\frac{(O+L)\cdot\left(M_{sc}^{PUSCH\_initial}\cdot N_{Symb}^{PUSCH\_initial}-Q'_{RI}\right)\cdot\beta_{offset}^{CQI}}{\sum_{r=0}^{C-1}K_r+(O+L)\cdot\beta_{offset}^{CQI}},$$

where O is a number of CQI bits, L is a number of Cyclic Redundancy Check, CRC, bits added to the CQI bits, $M_{sc}^{PUSCH\text{-}intial}$ is a number of subcarriers in an initial PUSCH transmission subframe, $N_{symb}^{PUSCH\text{-}initial}$ is a number of Single Carrier frequency Division Multiple Access, SC-FDMA, symbols in the initial PUSCH transmission subframe, $Q'_{RI}$ is a number RI code symbols, $\beta_{offset}^{CQI}$ is a first beta offset determined according to a number of transmission codewords for transmission blocks, C is a total number of code blocks, CBs, $K_r$ is a size of each of the CBs, and r is a code block number.

2. The method according to claim 1, further comprising, performing codeword-to-layer mapping on the UCI at a bit level.

3. The method according to claim 1, further comprising performing codeword-to-layer mapping on the UCI at the level of a vector sequence allocated per modulation symbol.

4. The method according to claim 1, further comprising performing codeword-to-layer mapping on the UCI at the level of a bit stream having as many bits as required for modulation symbols allocated to one row in a channel interleaver.

5. The method according to claim 1, further comprising performing codeword-to-layer mapping on the UCI at the level of a bit stream having as many bits as the number of columns in a channel interleaver.

6. The method according to claim 1, wherein the number of the second REs is calculated by:

$$\frac{O^{RI}\cdot\beta_{offset}^{RI}\cdot M_{sc}^{PUSCH\_initial}\cdot N_{symb}^{PUSCH\_initial}}{\sum_{r=0}^{C^{(1)}-1}K_r^{(1)}+\sum_{r=0}^{C^{(2)}-1}K_r^{(2)}+\frac{\sum_{r=0}^{C^{(1)}-1}K_r^{(1)}+\sum_{r=0}^{C^{(2)}-1}K_r^{(2)}}{\sum_{r=0}^{C^{(CQI)}-1}K_r^{(CQI)}}(O^{CQI}+L)\beta_{offset}^{CQI}+O^{RI}\cdot\beta_{offset}^{RI}},$$

where $O^{RI}$ is a number of RI bits, $\beta_{offset}^{RI}$ is a second beta offset determined according to the number of the transmission codewords, $K_r^{(1)}$ is a size of a first CB and $K_r^{(2)}$ is a size of a second CB in a case of when two CBs are used, $K_r^{(CQI)}$ is a size of a CB carrying the CQI, and $O^{CQI}$ is the number of CQI bits.

7. The method according to claim 1, wherein the number of the fourth REs is calculated by:

$$\frac{O^{ACK}\cdot\beta_{offset}^{ACK}\cdot M_{sc}^{PUSCH\_initial}\cdot N_{symb}^{PUSCH\_initial}}{\sum_{r=0}^{C^{(1)}-1}K_r^{(1)}+\sum_{r=0}^{C^{(2)}-1}K_r^{(2)}+\frac{\sum_{r=0}^{C^{(1)}-1}K_r^{(1)}+\sum_{r=0}^{C^{(2)}-1}K_r^{(2)}}{\sum_{r=0}^{C^{(CQI)}-1}K_r^{(CQI)}}(O^{CQI}+L)\beta_{offset}^{CQI}+O^{RI}\cdot\beta_{offset}^{RI}+O^{ACK}\cdot\beta_{offset}^{ACK}},$$

where $O^{ACK}$ is a number of ACK/NACK bits, $\beta_{offset}^{ACK}$ is a third beta offset determined according to the number of the transmission codewords, $K_r^{(1)}$ is a size of a first CB and $K_r^{(2)}$ is a size of a second CB in a case of when two CBs are used, $K_r^{(CQI)}$ is a size of a CB carrying the CQI, $O^{CQI}$ is the number of CQI bits, $O^{RI}$ is a number of RI bits, $\beta_{offset}^{RI}$ is a second beta offset determined according to the number of the transmission codewords.

8. A User Equipment (UE) for transmitting Uplink Control Information (UCI) having a large payload size in a wireless access system, the UE comprising:

a transmission module configured to transmit a wireless signal through an antenna;

a reception module configured to receive a wireless signal through the antenna; and a processor configured to support transmission of the UCI having the large payload size, wherein the processor obtains a number of first Resource Elements (REs) allocated to a Channel Quality Indicator (CQI) information to be included in the UCI, obtains a number of second REs allocated to a Rank Indicator (RI) information to be included in the UCI, obtains a coding rate of data transmitted along with the UCI according to the number of the first REs and the number of the second REs, obtains a number of third REs allocated to the UCI based on the coding rate of the data, and controls the transmission module to transmit the UCI to a Base Station (BS) through the antenna by multiplexing the UCI into a Physical Uplink Shared CHannel (PUSCH) based on the number of the third REs, and wherein when the coding rate of the data is obtained, the processor does not consider a number of fourth REs allocated to an ACKnowledgement/Negative ACKnowledgement (ACK/NACK) information to be included in the UCI, and wherein the number of the first REs is calculated by:

$$\frac{(O+L)\cdot\left(M_{sc}^{PUSCH\_initial}\cdot N_{Symb}^{PUSCH\_initial}-Q'_{RI}\right)\cdot\beta_{offset}^{CQI}}{\sum_{r=0}^{C-1}K_r+(O+L)\cdot\beta_{offset}^{CQI}},$$

where O is a number of COI bits, L is a number of Cyclic Redundancy Check, CRC, bits added to the CQI bits, $M_{sc}^{PUSCH\text{-}initial}$ is a number of subcarriers in an initial PUSCH transmission subframe, $N_{symb}^{PUSCH\text{-}initial}$ is a number of Single Carrier frequency Division Multiple Access, SC-FDMA, symbols in the initial PUSCH transmission subframe, $Q'_{RI}$ is a number of RI code symbols, $\beta_{offset}^{CQI}$ is a first beta offset determined according to a number of transmission codewords for transmission blocks, C is a total number of code blocks, CBs, $K_r$ is a size of each of the CBs, and r is a code block number.

9. The UE according to claim 8, wherein the processor performs codeword-to-layer mapping on the UCI at a bit level, at the level of a vector sequence allocated per modulation symbol, at the level of a bit stream having as many bits as required for modulation symbols allocated to one row in a channel interleaver, or at the level of a bit stream having as many bits as the number of columns in a channel interleaver.

10. The UE according to claim 8, wherein the number of the second REs is calculated by;

$$\frac{O^{RI} \cdot \beta_{offset}^{RI} \cdot M_{sc}^{PUSCH\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} + \frac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L)\beta_{offset}^{CQI} + O^{RI} \cdot \beta_{offset}^{RI}},$$

where is a number of RI bits, $\beta_{offset}^{RI}$ is a second beta offset determined according to the number of the transmission codewords, $K_r^{(1)}$ is a size of a first CB and $K_r^{(2)}$ is a size of a second CB in a case of when two CBs are used, $K_r^{(CQI)}$ is a size of a CB carrying the CQI, and $O^{CQI}$ is the number of CQI bits.

11. The UE according to claim 8, wherein the number of the fourth REs is calculated by:

$$\frac{O^{ACK} \cdot \beta_{offset}^{ACK} \cdot M_{sc}^{PUSCH\_initial} \cdot N_{symb}^{PUSCH\_initial}}{\sum_{r=0}^{C^{(1)}-1} K_r^{(1)} + \sum_{r=0}^{C^{(2)}-1} K_r^{(2)} + \frac{\sum_{r=0}^{C^{(1)}-1} K_r^{(1)} + \sum_{r=0}^{C^{(2)}-1} K_r^{(2)}}{\sum_{r=0}^{C^{(CQI)}-1} K_r^{(CQI)}} (O^{CQI} + L)\beta_{offset}^{CQI} + O^{RI} \cdot \beta_{offset}^{RI} + O^{ACK} \cdot \beta_{offset}^{ACK}},$$

where $O^{ACK}$ is a number of ACK/NACK bits, $\beta_{offset}^{ACK}$ is a third beta offset determined according to the number of the transmission codewords, $K_r^{(1)}$ is a size of a first CB and $K_r^{(2)}$ is a size of a second CB in a case of when two CBs are used, $K_r^{(CQI)}$ is a size of a CB carrying the CQI, $O^{CQI}$ is the number of CQI bits, $O^{RI}$ is a number of RI bits, $\beta_{offset}^{RI}$ is a second beta offset determined according to the number of the transmission codewords.

* * * * *